US011954754B2

(12) United States Patent
Yamashita et al.

(10) Patent No.: US 11,954,754 B2
(45) Date of Patent: Apr. 9, 2024

(54) COMPUTING SYSTEM CONFIGURING DESTINATION ACCELERATORS BASED ON USAGE PATTERNS OF USERS OF A TRANSPORT SERVICE

(71) Applicant: Uber Technologies, Inc., San Francisco, CA (US)

(72) Inventors: Yuhki Yamashita, San Francisco, CA (US); Didier Patrick Hilhorst, San Francisco, CA (US); Bryant Jow, San Francisco, CA (US); Peter Ng, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 1250 days.

(21) Appl. No.: 16/440,567

(22) Filed: Jun. 13, 2019

(65) Prior Publication Data
US 2019/0295206 A1 Sep. 26, 2019

Related U.S. Application Data

(63) Continuation of application No. 15/395,341, filed on Dec. 30, 2016, now Pat. No. 10,417,727.
(Continued)

(51) Int. Cl.
*G06Q 50/30* (2012.01)
*G06F 3/04842* (2022.01)
(Continued)

(52) U.S. Cl.
CPC ......... *G06Q 50/30* (2013.01); *G06F 3/04842* (2013.01); *G06F 3/0485* (2013.01);
(Continued)

(58) Field of Classification Search
CPC .... G06F 9/451; G06F 3/04842; G06F 3/0485; H04L 67/52; H04L 67/60; H04L 67/1095;
(Continued)

(56) References Cited

U.S. PATENT DOCUMENTS 5,495,389 A   2/1996 Dewitt
5,598,318 A   1/1997 Dewitt
(Continued)

FOREIGN PATENT DOCUMENTS

CA   2604321   10/2006
CA   2975002   8/2016
(Continued)

OTHER PUBLICATIONS

Jain et al., "Context based adaptation of application icons in mobile computing devices", 2013 Third World Congress on Information and Communication Technologies (WICT 2013) (pp. 31-36) (Year: 2013).*
(Continued)

*Primary Examiner* — Rupangini Singh
(74) *Attorney, Agent, or Firm* — Mahamedi IP Law LLP

(57) ABSTRACT

A computing system can detect the launch of a rider application on computing devices of users of a transport service. The computing system can receive location data indicating the current location of each user, and determine a usage pattern for each user based on historical data corresponding to historical utilization of the transport service by the user. Based on the current location and the usage pattern of the user, the computing system can determine one or more suggested destination locations for the user, and transmit, over the one or more networks, display data to cause the rider application to display a destination accelerator for each of the one or more suggested destination locations. The destination accelerator can be selectable by the user to
(Continued)

automatically input a destination location into a transport request for the transport service.

20 Claims, 10 Drawing Sheets

Related U.S. Application Data

(60) Provisional application No. 62/399,642, filed on Sep. 26, 2016.

(51) Int. Cl.
    *G06F 3/0485*     (2022.01)
    *G06F 9/451*     (2018.01)
    *G06Q 10/00*     (2023.01)
    *G06Q 10/1093*     (2023.01)
    *H04L 67/1095*     (2022.01)
    *H04L 67/306*     (2022.01)
    *H04L 67/52*     (2022.01)
    *H04L 67/60*     (2022.01)

(52) U.S. Cl.
    CPC ............ *G06F 9/451* (2018.02); *G06Q 10/00* (2013.01); *G06Q 10/1095* (2013.01); *H04L 67/1095* (2013.01); *H04L 67/306* (2013.01); *H04L 67/52* (2022.05); *H04L 67/60* (2022.05)

(58) Field of Classification Search
    CPC ... H04L 67/306; G06Q 10/1095; G06Q 50/30
    See application file for complete search history.

(56) References Cited

U.S. PATENT DOCUMENTS

| | | | |
|---|---|---|---|
| 5,986,891 A | 11/1999 | Sugimoto | |
| 6,668,177 B2 | 12/2003 | Salmimaa | |
| 7,024,205 B1 | 4/2006 | Hose | |
| 7,519,916 B1 | 4/2009 | Hartwell | |
| 8,340,691 B1 | 12/2012 | Starenky et al. | |
| 8,630,987 B2 | 1/2014 | Prada Gomez | |
| 8,976,536 B2 | 3/2015 | French, Jr. | |
| 9,197,696 B1 | 11/2015 | Jakatdar | |
| 9,244,147 B1 | 1/2016 | Soundararajan | |
| 9,922,469 B1 | 3/2018 | Ashton | |
| 9,997,863 B2 | 5/2018 | Dryjanski | |
| 9,990,655 B2 | 6/2018 | MacTiernan | |
| 10,356,927 B2 | 7/2019 | Ehlen | |
| 10,417,727 B2* | 9/2019 | Yamashita | ............ G06F 3/0485 |
| 10,622,026 B1 | 4/2020 | Tsorng | |
| 10,721,327 B2 | 7/2020 | Cheng | |
| 11,196,838 B2 | 12/2021 | Cheng | |
| 2002/0034292 A1 | 3/2002 | Tuoriniemi | |
| 2003/0151332 A1 | 8/2003 | Chen | |
| 2004/0198366 A1 | 10/2004 | Crocker | |
| 2004/0202132 A1 | 10/2004 | Heinonen | |
| 2005/0177799 A1 | 8/2005 | Knight | |
| 2006/0059023 A1* | 3/2006 | Mashinsky | ............ G06Q 10/02 705/5 |
| 2007/0011233 A1 | 1/2007 | Manion | |
| 2009/0113296 A1 | 4/2009 | Lacy | |
| 2009/0296990 A1 | 12/2009 | Holland | |
| 2010/0076795 A1 | 3/2010 | Steir | |
| 2010/0097912 A1 | 4/2010 | Lin | |
| 2010/0179750 A1* | 7/2010 | Gum | ............ G01C 21/362 701/533 |
| 2011/0035142 A1 | 2/2011 | Tang | |
| 2011/0053552 A1 | 3/2011 | Kim | |
| 2011/0099040 A1 | 4/2011 | Felt | |
| 2011/0153629 A1 | 6/2011 | Lehmann | |
| 2011/0016862 A1 | 7/2011 | Eshed | |
| 2011/0219328 A1* | 9/2011 | Ilvessalmi | ............ G06Q 10/109 715/810 |
| 2011/0238289 A1 | 9/2011 | Lehmann | |
| 2011/0307282 A1 | 12/2011 | Camp | |
| 2011/0310552 A1 | 12/2011 | Huang | |
| 2012/0150436 A1 | 6/2012 | Rossano | |
| 2012/0253548 A1 | 10/2012 | Davidson | |
| 2012/0311584 A1 | 12/2012 | Gruber | |
| 2013/0036117 A1 | 2/2013 | Fisher | |
| 2013/0090950 A1 | 4/2013 | Rao | |
| 2013/0132140 A1* | 5/2013 | Amin | ............... G06Q 30/0284 705/7.13 |
| 2013/0138723 A1 | 5/2013 | Ku | |
| 2013/0185152 A1 | 7/2013 | Aaron | |
| 2013/0246301 A1 | 9/2013 | Radhakrishnan | |
| 2013/0268406 A1 | 10/2013 | Radhakrishnan | |
| 2013/0282283 A1 | 10/2013 | Bondesen | |
| 2013/0285855 A1 | 10/2013 | Dupray | |
| 2013/0311997 A1 | 11/2013 | Gruber | |
| 2014/0040079 A1 | 2/2014 | Smirin | |
| 2014/0082069 A1 | 3/2014 | Varoglu | |
| 2014/0129951 A1 | 5/2014 | Amin | |
| 2014/0164525 A1 | 6/2014 | Malik | |
| 2014/0195972 A1* | 7/2014 | Lee | ........ G06F 3/0482 715/811 |
| 2014/0221006 A1 | 8/2014 | Jhanji | |
| 2014/0307386 A1 | 10/2014 | French, Jr. | |
| 2014/0364150 A1* | 12/2014 | Marti | ............ H04W 4/029 455/456.3 |
| 2015/0012341 A1 | 1/2015 | Amin | |
| 2015/0039368 A1 | 2/2015 | Polyakov | |
| 2015/0099461 A1 | 4/2015 | Holden | |
| 2015/0161564 A1 | 6/2015 | Sweeney | |
| 2015/0161752 A1 | 6/2015 | Barreto | |
| 2015/0241239 A1 | 8/2015 | van Dok | |
| 2015/0248689 A1 | 9/2015 | Paul | |
| 2015/0339928 A1 | 11/2015 | Ramanujam | |
| 2016/0006702 A1 | 1/2016 | Chestnut | |
| 2016/0026936 A1 | 1/2016 | Richardson | |
| 2016/0027306 A1 | 1/2016 | Lambert | |
| 2016/0048804 A1 | 2/2016 | Paul | |
| 2016/0054767 A1 | 2/2016 | Chen | |
| 2016/0069694 A1 | 3/2016 | Tao | |
| 2016/0078374 A1 | 3/2016 | Lippow | |
| 2016/0104112 A1 | 4/2016 | Gorlin | |
| 2016/0105787 A1 | 4/2016 | Hammer | |
| 2016/0140789 A1 | 5/2016 | Wickersham, III | |
| 2016/0165510 A1 | 6/2016 | Jun | |
| 2016/0171584 A1 | 6/2016 | Cao | |
| 2016/0203522 A1 | 7/2016 | Shiffert | |
| 2016/0203576 A1 | 7/2016 | Novak | |
| 2016/0300318 A1 | 10/2016 | Godil | |
| 2016/0301698 A1 | 10/2016 | Katara | |
| 2016/0370194 A1 | 12/2016 | Colijn | |
| 2017/0013408 A1 | 1/2017 | Grzywaczewski | |
| 2017/0052034 A1 | 2/2017 | Magazinik | |
| 2017/0059347 A1 | 3/2017 | Flier | |
| 2017/0115125 A1 | 4/2017 | Outwater | |
| 2017/0126837 A1 | 5/2017 | Wang | |
| 2017/0132540 A1 | 5/2017 | Haparnas | |
| 2017/0147951 A1 | 5/2017 | Meyer | |
| 2017/0147959 A1 | 5/2017 | Sweeney | |
| 2017/0169366 A1 | 6/2017 | Klein | |
| 2017/0186126 A1 | 6/2017 | Marco | |
| 2017/0191842 A1 | 7/2017 | Magazinik | |
| 2017/0193458 A1 | 7/2017 | Marco | |
| 2017/0220966 A1 | 8/2017 | Wang | |
| 2017/0240098 A1 | 8/2017 | Sweeney | |
| 2017/0255881 A1 | 9/2017 | Ritch | |
| 2017/0255966 A1 | 9/2017 | Khoury | |
| 2017/0270794 A1 | 9/2017 | Sweeney | |
| 2017/0272901 A1 | 9/2017 | Chen | |
| 2017/0357408 A1 | 12/2017 | Anglin | |
| 2018/0091604 A1 | 3/2018 | Yamashita | |
| 2018/0092057 A1 | 3/2018 | Yamashita | |
| 2018/0131767 A1 | 5/2018 | Kozman | |
| 2018/0158166 A1 | 6/2018 | Tulabandhula | |
| 2018/0189918 A1 | 7/2018 | Lu | |
| 2018/0315021 A1 | 11/2018 | Bijor | |
| 2019/0045651 A1 | 2/2019 | Ehlen | |
| 2019/0050775 A1 | 2/2019 | Bijor | |
| 2019/0109926 A1 | 4/2019 | Hotchkies | |

(56) References Cited

U.S. PATENT DOCUMENTS

| | | |
|---|---|---|
| 2019/0230180 A1 | 7/2019 | Wang |
| 2019/0306258 A1 | 10/2019 | Yamashita |
| 2020/0022101 A1 | 1/2020 | Yamashita |
| 2020/0081933 A1 | 3/2020 | Jiang |
| 2020/0221257 A1 | 7/2020 | Zhang |
| 2020/0273337 A1 | 8/2020 | Sweeney |
| 2020/0322451 A1 | 10/2020 | Cheng |
| 2021/0112674 A1 | 4/2021 | Ehlen |
| 2021/0213933 A1 | 7/2021 | Borrelli |
| 2021/0337047 A1 | 10/2021 | Cheng |
| 2022/0027805 A1 | 1/2022 | Bijor |
| 2022/0156338 A1 | 5/2022 | Jiang |
| 2022/0223043 A1 | 7/2022 | Sweeney |

FOREIGN PATENT DOCUMENTS

| | | |
|---|---|---|
| WO | WO 2010142862 | 12/2010 |
| WO | WO 2011067741 | 6/2011 |
| WO | WO2011/132181 | 10/2011 |
| WO | WO 2014074407 | 5/2014 |

OTHER PUBLICATIONS

Office Action in CA 3017638 dated Jun. 22, 2022.
Office Action in CA 3017822 dated Jun. 1, 2022.
Borison, Rebecca, "Uber Brings its SUV Fleet to NYC", Jul. 30, 2014, Business Insider, p. 1.
Hilen, Brittany, Uber and Google bring WIFI to cars in Philadelphia, Slashgear, dated Jul. 24, 2014, p. 1, https://web.archive.org/web/20140724201314/http://www.slashgear.com/uber-and-google-bring-wifi-to-cars-in-philadelphia-22338326.
ISR and Written Opinion in PCT/US2017/053469 dated Dec. 8, 2017.
Cody Toombs: Maps v.9.19 Introduces New 'Driving Mode' with Traffic Update and ETAs, Audio Toggle for Navigation, and Timeline Seetings [APK Download and Teardown], Jan. 12, 2016 URL: http:// www.androidpolice.Com/2016/01/12/maps-v9-19 -introduces - new-driving-mode-with-traffic-updates -and-etas-audio-toggle-for-navigation- and-timeline-seetings-apk-download- teardown/.
Darrell Etherington: "Google Maps on Mobile Gets Uber Integration and More", May 6, 2014 URL: https//techcrunch.com /2014/05/06/google-maps-on-mobile- gets-uber-integration-and-more.
EESR issued in EP 16735494.3 dated May 18, 2018.
Exam Report No. 1 is AU 2016205059 dated Oct. 29, 2020.
Written Opinion in PCT/US2018/046496 dated Aug. 5, 2019.
ISR and Written Opinion dated Jan. 11, 2018 in PCT/US2017/053514.
Mclaren, Sharing Cities, MIT Press, 2015, pp. 21-69.
Edelman, Computing the Mind, Oxford University Press, 2008, pp. xi-36.
Wirth, Algorithms + Data Structures = Programs, 1976, pp. xii-55.
Lakoff, Metaphors We Live By, University of Chicago Press, 1980, pp. ix-55.
Goffman, Frame Analysis, Northeastern University Press, 1974, pp. 1-39, 301-344.
Gupta, Inside Bluetooth Low Energy, Artech House, 2013, pp. 119-130.
Jain, "Contextual Adaptive User Interface for Android Devices", Annual IEEE India Conference (INDICON), IEEE, pp. 1-4 (2013).
Office Action in EP 17783640.0 dated Jan. 12, 2021.
Trasee, UberEVENTS: A Ride for Every Occasion, Uber Newsroom, Nov. 16, 2015, https://www.uber.com/newsroom/uberevents-a-ride-for-every-occasion/.
Harmon, W., Icy Dock EZConvert MB705M2P-B Review M.2 to U.2 NVMe SSD Adapter, Jul. 5, 2019.

* cited by examiner

COMPUTING SYSTEM CONFIGURING DESTINATION ACCELERATORS BASED ON USAGE PATTERNS OF USERS OF A TRANSPORT SERVICE

CROSS REFERENCE TO RELATED APPLICATION

This application is a continuation of U.S. patent application Ser. No. 15/395,341, filed on Dec. 30, 2016; which claims the benefit of priority to U.S. Provisional Application No. 62/399,642, filed on Sep. 26, 2016; the aforementioned applications being hereby incorporated by reference in their respective entireties.

BACKGROUND

User centric network services typically sequence users through a number of selection interfaces so that the user can specify certain information for a desired type of service, including service level selections and preferences With enhancements in network and mobile technology, the number of on-demand services for user selection is also increasing, creating inconvenience for human operators. Moreover, the time needed for selection can occupy an interface device, creating performance issues and draining resources of the operative selection device.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
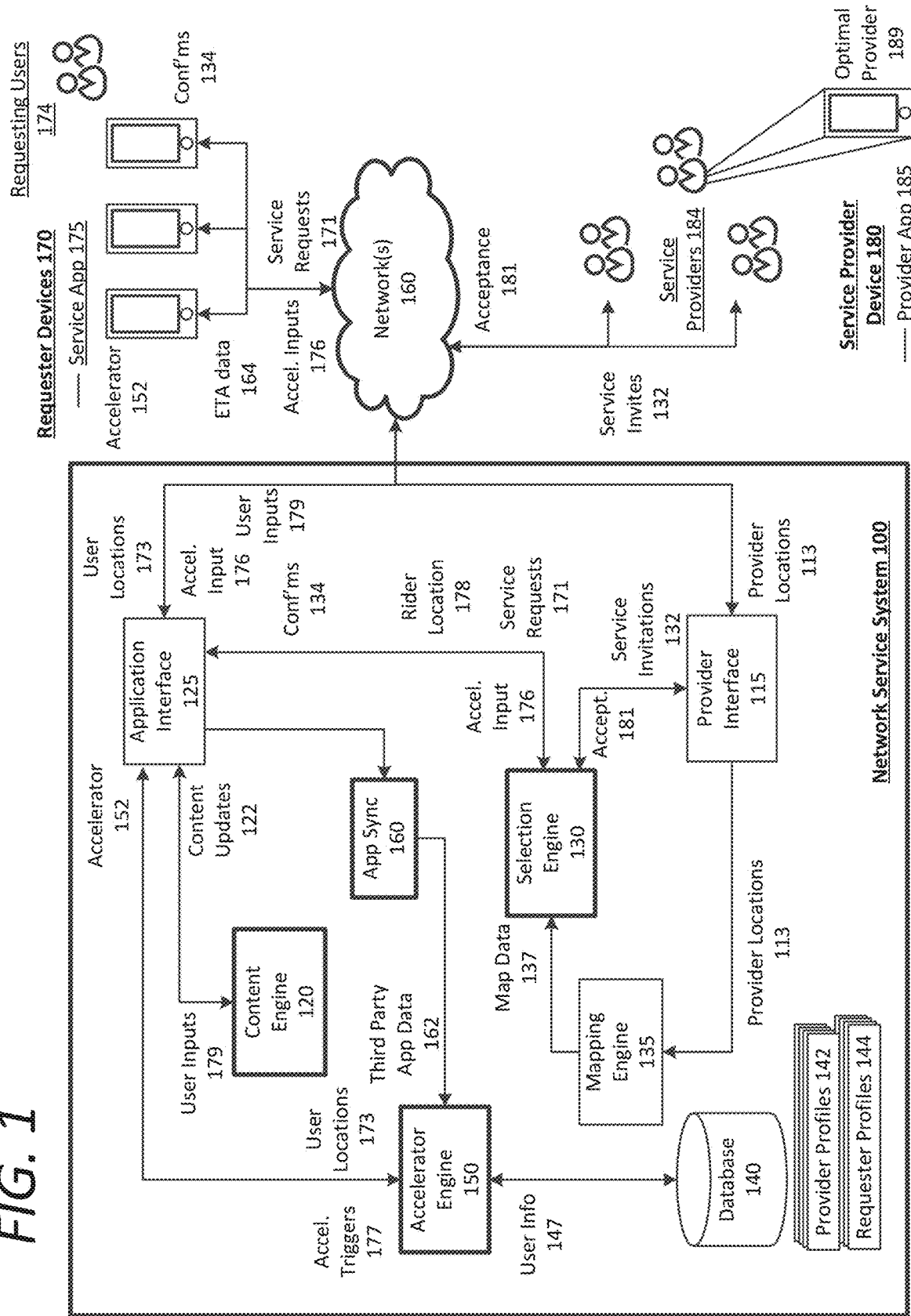
FIG. 1 is a block diagram illustrating an example network computer system in communication with user and service provider devices, in accordance with examples described herein.

A network computer system is provided herein that manages an on-demand network-based service linking available service providers with service requesters throughout a given region (e.g., a metroplex such as the San Francisco Bay Area). In doing so, the network computer system can receive service requests for on-demand services from requesting users via a designated service application executing on the users' mobile computing devices. Based on a detected service location or an inputted service location (e.g., a pick-up location), the network computer system can identify a number of proximate available service providers (e.g., available drivers) and transmit a service invitation to one or more service provider devices of the proximate available service providers to fulfill the service request. In many examples, the service providers can either accept or decline the service invitation based on, for example, the service location being impractical for the service provider.

In determining an optimal service provider to fulfill or complete a given service request, the network computer system can identify a plurality of candidate service providers to fulfill the service request based on a service location indicated in the service request. For example, the network computer system can determine a geo-fence surrounding the service location (or a geo-fence defined by a radius away from the service location), identify a set of candidate service providers (e.g., twenty or thirty service providers within the geo-fence), and select an optimal service provider (e.g., a closest service provider to the service location, a service provider with the shortest estimated travel time to the service location, a service provider traveling to a location within a specified distance or specified travel time to the service location, etc.) from the candidate service providers to fulfill the service request. According to examples provided herein, the network computer system can compile historical data for individual users with regard to the on-demand network-based service. Thus, the network computer system can manage a user profile for each user indicating routine start and/or end locations (or regions), and/or routine routes (e.g., for a transportation service from home to work and/or vice versa) and/or preferred service types (e.g., transportation, delivery, mailing, etc.). In some examples, the network computer system can further synchronize with a user device to, for example, identify the user's contacts, the user's schedule and appointments, travel plans (e.g., a scheduled trip), and the like.

In various implementations, the network computer system can establish a set of criteria that determines when a service accelerator is to be displayed on the user device. According to examples herein, a service accelerator refers to a selectable feature on a client application that, when selected by a user, automatically associates a transport or service request with a set of parameters, preconfigured settings based on contextual information, and/or a set of service criteria. In some examples, the network computer system can associate a particular location (e.g., a work or home location) with a time of day (or a time period of day), and establish a service accelerator for the user based on the location and time of day. For example, the historical data for the user may indicate that the user routinely utilizes the transport service (e.g., twice a week or multiple times a month, etc.) to travel home on weekdays at or around 7:30 pm. Thus, the network computer system can generate a "home" service accelerator that can be displayed on the user's device (e.g., a user interface corresponding to the executing service application on the user device) a certain time period prior to 7:30 pm on every weekday (e.g., 5:00 pm-7:30 pm or even to a time after 7:30 pm, alternatively, such as 5-9 pm). As an addition or an alternative, the network computer system can use contextual information associated with the user, such as where the user currently is, to determine whether or not to display the "home" service accelerator (e.g., if the user is currently at or within a predefined distance of the user's home or is located in another state or country, the "home" service accelerator would not be displayed). As another example, historical data for the user may indicate that the user routinely utilizes the on-demand service to go to the gym after work (e.g., around 6 pm or 7 pm multiple times a week). Thus, the network computer system can generate a "gym" service accelerator for the user for display on the user's device a certain time prior to the end of the workday.

According to examples described herein, selection of a service accelerator by the user can automatically cause the network computer system to receive, from the user device, a service request, and process the service request without any additional input or subsequent manual intervention by the user (e.g., begin selection process to select a proximate service provider to service the ride). In some examples, the service accelerator, or accelerator feature, can greatly reduce the number of sequential screens needed by current transport service applications in order to confirm a service request. In other examples, selection of a service accelerator can cause a confirmation screen to be displayed (e.g., confirming the estimated service cost, service type, pick-up location and/or destination, service time, etc.) on the client application. In such examples, the service accelerator can save the user the trouble of having to manually input certain items such as a pick-up location and/or destination, and/or manually selecting a service type, and the user can select a request or confirm feature from the confirmation screen without having to manually input other information in order to make a request for the service (e.g., a two-click request after opening or launching the client application).

In variations, a single selection of the displayed service accelerator can automatically cause the network computer system to configure the on-demand service with preconfigured settings for the service type, and utilize the user's current location or address to determine an ideal service location. Additionally or alternatively, the service accelerator can be displayed with an estimated or upfront price of the service (e.g., a computed value before a service is requested), the service type, and/or an estimated time of arrival of a nearest service provider. In some aspects, the upfront price or estimated price can be displayed with individual service accelerators based on current price and service type that corresponds to the service accelerator (e.g., when there is high GPS confidence of the current location of the user). Accordingly, the user may be presented with important data corresponding to the resultant ride along with the service accelerator itself. Furthermore, upon confirmation of the service request, the user's device can display information indicating that the service provider is en route to rendezvous with the user (e.g., traveling to the pick-up location), and information to enable the user to identify the service provider and/or the service provider's vehicle when the service provider approaches the rendezvous location.

In various examples, multiple service accelerators may be displayed on the user interface of the service application at any given time. Some service accelerators may be persistent, or displayed by default—such as those associated with the user's routine destinations. For example, whenever the user is away from home, the network computer system can generate a home service accelerator (i.e., a home "destination" accelerator) for display on the user's device to enable the user to readily request a ride home. In variations, the network computer system can provide the home service accelerator at certain times of the day and/or days of the week, or when the user's current location is a predefined distance away from the user's home location (e.g., two miles) and/or within a predefined distance of the user's home location (e.g., fifty miles). As an example, the network computer system can push home service accelerators to user devices on Friday and/or Saturday nights to aid in the overall prevention of driving under the influence (e.g., conditioned upon the user being away from home or at a restaurant, bar, or nightclub location).

Additionally, the network computer system can analyze the historical data associated with the user's profile to determine any particular patterns in the user's routines with regard to the on-demand network-based service. For example, the user may routinely request service at a particular location on a certain day of the month or year. In variations, the network computer system can determine a pattern in which the user meets another user of the on-demand service in a routine manner, and can correlate the two users to generate a service accelerator that specifies a person as opposed to a specified location. As such, the service accelerator can be selected by the user to request transportation to the other user's current location, or to a scheduled meeting location for both users. Along these lines, the network computer system can synchronize with other applications on the computing devices of the users, and can correlate schedules and/or appointments of an individual user, or between multiple users of the transport service. Thus, service accelerators can be generated in accordance with third party applications on the computing devices of users, and can also include other user locations in addition to specific destination locations.

As provided herein, the terms "user" and "service requester" may used throughout this application interchangeably to describe a person who utilizes a service application on a computing device to request, over one or more networks, on demand services from a network computing system. Furthermore, the terms "service accelerator" and "accelerator feature" may be used in this application interchangeably to represent a displayed feature or icon on the service requester's computing device that, when selected, provides an accelerated process of requesting the on-demand service. For example, selection of the "service accelerator" or "accelerator feature" can cause the computing device of the service requester to automatically determine a location where the on-demand service is to be fulfilled or completed, or where a service provider is to rendezvous with the service requester.

Among other benefits, the examples described herein achieve a technical effect of improving user experience with regard to utilizing an on-demand network-based service. The use of service accelerators leverages historical user data to provide the user with a more straightforward, time-sensitive, and intuitive approach to utilizing the on-demand network-based service.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network-based service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Descriptions

FIG. 1 is a block diagram illustrating an example network computer system in communication with user and service provider devices, in accordance with examples described herein. The network computer system 100 can manage an on-demand network service that connects requesting users 174 with service providers 184 that are available to service the users' 174 service requests 171. The on-demand network-based service can provide a platform that enables on-demand services (e.g., ride sharing services) between requesting users 174 and available service providers 184 by way of a service application 175 executing on the requester devices 170, and a service provider application 185 executing on the service provider devices 180. As used herein, a requester device 170 and a service provider device 180 can comprise a computing device with functionality to execute a designated application corresponding to the transportation arrangement service managed by the network computer system 100. In many examples, the requester device 170 and the service provider device 180 can comprise mobile computing devices, such as smartphones, tablet computers, VR or AR headsets, on-board computing systems of vehicles, and the like. Example on-demand network-based services can comprise on-demand delivery, package mailing, shopping, construction, plumbing, home repair, housing or apartment sharing, etc., or can include transportation arrangement services implementing a ride sharing platform.

The network computer system 100 can include an application interface 125 to communicate with requester devices 170 over one or more networks 160 via a service application 175. According to examples, a requesting user 174 wishing to utilize the on-demand network-based service can launch the service application 175 and transmit a service request 171 over the network 160 to the network computer system 100. In certain implementations, the requesting user 174 can view multiple different service types managed by the network computer system 100, such as ride-pooling, a basic ride share services, a luxury vehicle service, a van or large vehicle service, a professional driver service (e.g., where the service provider is certified), a self-driving vehicle transport service, and the like. The network computer system 100 can utilize the service provider locations 113 to provide the requester devices 170 with ETA data 164 of proximate service providers for each respective service. For example, the service application 175 can enable the user 174 to scroll through each service type. In response to a soft selection of a particular service type, the network computer system 100 can provide ETA data 164 on a user interface of the service app 175 that indicates an ETA of the closest service provider for the service type, and/or the locations of all proximate available service providers for that service type. As the user scrolls through each service type, the user interface can update to show visual representations of service providers (e.g., vehicles) for that service type on a map centered around the user 174 or a pick-up location set by the user. The user can interact with the user interface of the service app 175 to select a particular service type, and transmit a service request 171.

In some examples, the service request 171 can include a service location within a given region (e.g., a pick-up location within a metropolitan area managed by one or more datacenters corresponding to the network computer system 100) in which a matched service provider is to rendezvous with the requesting user 174. The service location can be inputted by the user by setting a location pin on a user interface of the service app 175, or can be determined by a current location of the requesting user 174 (e.g., utilizing location-based resources of the requester device 170). Additionally, for on-demand transport services, the requesting user 174 can further input a destination during or after submitting the service request 171.

In various implementations, the network computer system 100 can further include a selection engine 130 to process the service requests 171 in order to ultimately select service providers 184 to fulfill the service requests 171. The network computer system 100 can include a service provider interface 115 to communicate with the service provider devices 180 via the service provider application 185. In accordance with various examples, the service provider devices 180 can transmit their current locations using location-based resources of the service provider devices 180 (e.g., GPS resources). These service provider locations 113 can be utilized by the selection engine 130 to identify a set of candidate service providers 184, in relation to the service location, that are available to fulfill the service request 171.

In certain implementations, the network computer system 100 can select a proximate self-driving vehicle (SDV) to service the service request 171 (e.g., a transportation request). Thus, the pool of proximate candidate service providers in relation to a rendezvous location can also include one or more SDVs operating throughout the given region.

In some aspects, the network computer system 100 can include a mapping engine 135, or can utilize a third-party mapping service, to generate map data 137 and or traffic data in the environment surrounding the service location. The mapping engine 135 can receive the service provider locations 113 and input them onto the map data 137. The selection engine 130 can utilize the current locations 113 of the service providers in the map data 137 (e.g., by setting a geo-fence surrounding the service location) in order to select an optimal service provider 189 to fulfill the service request 171. As provided herein, the optimal service provider 189 can be a service provider that is closest to the requesting user 174 with respect to distance or time, or can be a proximate service provider that is optimal for other reasons, such as the service provider's experience, the amount of time the service provider has been on the clock, the service provider's current earnings, and the like.

Once the optimal service provider 189 is selected, the selection engine 130 can generate a service invitation 132 to service the service request 171, and transmit the service invitation 132 to the optimal service provider's 189 device 180 via the service provider application 185. Upon receiving the service invitation 132, the optimal service provider 189 can either accept or reject the invitation 132. Rejection of the invitation 132 can cause the selection engine 130 to determine another optimal service provider from the candidate set of service providers 184 to fulfill the service request 171. However, if the optimal service provider accepts (e.g., via an acceptance input), then the acceptance input 181 can be transmitted back to the selection engine 130, which can generate and transmit a confirmation 134 of the optimal service provider 189 to the requesting user 174 via the service application 175 on the requesting user's 174 computing device 170.

According to examples provided herein, the network computer system 100 can include a content engine 120 that manages the manner in which content is displayed on the requester devices 170 and/or the service provider devices 180. Regarding the requester devices 170, the content engine 120 can provide content updates based on user inputs 179 on a user interface generated by the service application 175. For example, a user selection on a content feature of the service app 175 can cause the content engine 120 to generate a new screen on the service app 175, or cause a current screen to pivot between certain displayed features. When inputting a particular service location, the user may utilize a location pin and map content, and set the location pin on a particular location in the map content to input the service location. Additionally, the content engine 120 can cause a service location input box to overlay the map content, which can enable the requesting user 174 to select the input box to cause additional features to be displayed on the user interface (e.g., overlaying the map content). In variations, to return to the map content, the user 174 can input a gesture—such as a scroll or swipe gesture—anywhere on the screen. In response to the gesture, the content engine 120 can cause the additional features to dismiss, and re-enable map content scrolling with the location pin. These dynamically pivoting interfaces can be provided by the content engine 120 for the pick-up location input, the service location input, or both. Further description of the dynamically pivoting interfaces on the service application 175 is provided below with respect to FIG. 6C.

In various implementations, the network computer system 100 can further include a database 140 storing requester profiles 144 including historical information specific to the individual users 174 of the on-demand network-based service. Such information can include user preferences of service types, routine services, service locations, pick-up and destination locations, work addresses, home addresses, addresses of frequently visited locations (e.g., a gym, grocery store, mall, local airport, sports arena or stadium, concert venue, local parks, and the like). In addition, the database 140 can further store service provider profiles 142 indicating information specific to individual service providers, such as vehicle type, service qualifications, earnings data, and service provider experience.

According to examples, the network computer system 100 can include an accelerator engine 150 which can provide individualized service accelerators 152 to the requester devices 170 based on accelerator triggers 179. As provided herein, the accelerator triggers 179 can comprise current conditions that satisfy certain criteria for displaying a particular service accelerator 152 on a particular user's computing device 170. As a basic example, a home destination accelerator for an on-demand transport service would not be practical if the user 174 was already located at the user's home. Thus, a criterion for the home destination accelerator could be that the current location of the user must be different from the user's home location. More intricate service accelerators 152 may be associated with multiple criteria, such as a time window, a service type, certain days of the week, a location or area, appointment or scheduling data, and the like. In certain variations, the user 174 can manually configure the set of criteria for a service accelerator 152 via a configuration interface or settings feature of the service application 175. For example, the service application 175 can enable the user 174 configure a service accelerator 152 by selecting a service location and a service type so that a single input on the service accelerator 152 can cause the on-demand service to be arranged automatically, for the specified service type (e.g., a ride service to transport the user 174 to a specified destination). According to examples provided herein, when the accelerator triggers 179 satisfy a set of criteria for a specified service accelerator 152, the accelerator engine 150 can generate the specified service accelerator 152, and cause the accelerator 152 to be displayed on the requester device 170.

In configuring the set of criteria for each service accelerator 152, the accelerator engine 150 can analyze the user information 147 in the requester profiles 144. In some examples, certain default service accelerators 152 can be stored for the individual user, such as a home destination accelerator, a work destination accelerator, a gym destination accelerator, or an accelerator for a destination frequently visited by the user 174. In such examples, the service accelerator 152 for each of these default destinations may be displayed on the service app 175 (e.g., a home screen of the service app 175 for an on-demand transportation service) whenever the user 174 is not located at or within a certain proximity of the service accelerator's associated location. In variations, the service accelerator 152 for such default locations may also be constrained by one or more time windows (e.g., indicating a start time and an end time for displaying the accelerator 152) based on the routine behavior of the user 174.

As provided herein, the user information 147 can comprise historical data corresponding to the user's 174 utilization of the on-demand network-based service. In analyzing the user information 147, the accelerator engine 150 can identify certain patterns with regard to the user 174 submitting service requests 171. These patterns can include correlations between specific service locations, pick-up locations, destinations, time of day, day of the week, day of the year (e.g., a holiday, anniversary, birthday, etc.), season (e.g., a sports season), and the like. In some examples, if an identified pattern in the user information 147 meets a threshold level confidence or likelihood, then the accelerator engine 150 can generate a new service accelerator 152 based on the identified pattern. This new service accelerator 152 can be associated with certain accelerator triggers 179 corresponding to a set of criteria that causes the accelerator 152 to be displayed on the requester device 170.

As an example, the requester profile 144 for a particular user 174 may indicate that the user 174 typically utilizes an on-demand transportation service in which the user 174 visits a certain location at a certain time (e.g., a specific day of the week, time of day, and/or day of the year). The location may be a place of work, a city center, a train station, airport, a sporting venue, a restaurant, a church, a conference center, a hotel, a park, a cemetery, etc. The pattern identified by the accelerator engine 150 can correspond to the user 174 utilizing the on-demand transport service to visit the location on multiple occasions (e.g., an amusement park on Father's Day). In some examples, the accelerator engine 150 can calculate a probability that the user 174 will utilize the transportation service at a future time, and if the probability exceeds a certain threshold (e.g., 45%), the accelerator engine 150 can push a service accelerator 152 for the location at the appropriate time. Additionally or alternatively, the service accelerator 152 for the location can be presented on the requester device 170 for a certain period of time (e.g., three hours), and can expire or terminate from the display screen once the time period ends.

In addition, the network computer system 100 can include an application synchronizer 160, which can synchronize with the requester device 170 to access third party applications on the requester device 170, such as a calendar application, a travel application, e-mail, a contacts list, and the like (collectively "third party app data 162"). According to certain examples, the accelerator engine 150 can receive third party app data 162 from the application synchronizer 160 in order to determine whether a service accelerator 152 would be suitable or would otherwise assist the user 174. The accelerator engine 150 can further combine the third party app data 162 with the user information 147 to determine whether to generate a service accelerator 152. Comparisons between third party app data 162 and user information 147 can result in a wide range of correlations with varying complexity. For example, a calendar entry on a requester device 170 of a first user may indicate a meeting at a specified location with a second user in the contacts list of the first user. The accelerator engine 150 can identify the second user, and generate a service accelerator 152 for the second user at the specified location, based on the meeting indicated in the calendar entry of the first user.

In further examples, the third party application data 162 may indicate that the user 174 is scheduled for a flight from a local airport. Based on the user's travel schedule, the accelerator engine 150 can generate a destination accelerator 152 for the local airport for display on the requester's device 170 at a certain time prior to the scheduled flight departure (e.g., three hours prior). Still further, if the user 174 is located in a new place—such as a new city in which the user 174 has not previously utilized the on-demand network-based service—the accelerator engine 150 can identify certain interest locations for the user 174 and generate destination accelerators 152 for such interest locations. These locations may be general points of interest within the new place (e.g., popular tourist destinations), or can be customized for the user 174 based on interest patterns identified in the third party application data 162 and/or the user information 147. In one example, the user 174 may show an interest in highly-regarded restaurants, or have a favorite type of food. The accelerator engine 150 may identify a restaurant that matches the user's 174 interests, and generate a service accelerator 152 for that restaurant for display on the requester's device 170.

Thus, a virtually endless number of data combinations and correlations can result in the accelerator engine 150 generating a service accelerator 152 for a particular user 174. Once criteria are determined for a service accelerator 152, then the accelerator engine 150 can monitor current user conditions (e.g., the user's current location, a time of day, a schedule, etc.) for acceleration triggers 177. When a set of acceleration triggers 177 matches the set of criteria for a particular service accelerator 152, the accelerator engine 150 can generate the accelerator 152 to be displayed on the requester's device 170.

As provided herein, display of the service accelerators 152 on the requester devices 170 can correspond to a selectable feature on a home screen of the executing service application 175. In certain implementations, if the service application 175 is not currently executing, then the service accelerator 152 can be queued for display once the service application 175 is launched. Additionally, certain service accelerators 152 may be associated with a timer so that they expire and are automatically removed from the display. For example, the accelerator engine 150 can configure a work service accelerator 152 to expire at a local time of 10:00 am. As such, certain service accelerators 152 may be generated by the accelerator engine 150, but may expire without actually being displayed on the requester device 170.

In some variations, the accelerator engine 150 can generate and transmit a push notification to the user device 170 indicating that a service accelerator 152 has been triggered and is available for usage. This push notification can be provided to the requester device 170 regardless of which application, if any, is currently executing on the user device 170. The push notification can comprise any combination of a displayed indicator, a unique sound (e.g., a chime unique to the service application 175), and/or a haptic output on the requester device 170. This can enable the user 174 to identify the service accelerator 152 without launching the service application 175, and determine whether the user 174 wishes to utilize the service accelerator 152.

According to examples described herein, the user 174 can provide an accelerator input 176 on a particular service accelerator 152 displayed on the requester device 170. In many examples, the accelerator input 176 can comprise a touch selection on the displayed service accelerator 152, or can comprise a voice command or other predetermined gesture (e.g., a swipe gesture on the accelerator 152). In response to the accelerator input 176, the selection engine 130 can identify the destination corresponding to the selected accelerator 152, and automatically request a service provider to fulfill the service request corresponding to the service accelerator 152.

The selection engine 130 can process a service accelerator input 176 from a requester device 170 by initially determining a service location for the requesting user 174. In some aspects, the selection engine 130 can determine a user location 178 corresponding to the requesting user's 174 current location (e.g., via GPS resources of the requester device 170). The selection engine 130 may then independently configure a service location for the requesting user 174 based on the current location. For example, the selection engine 130 can identify the user's current address as the service location, or a nearest convenient street location or address that can function as a rendezvous point between the requesting user 174 and an optimal service provider 189 to fulfill the service request 171.

Alternatively, in response to the service accelerator input 176, the content engine 120 can cause a confirmation screen to be generated on the user app 175, which can query the requesting user 174 to confirm the service location. In either case, based on the user's 174 selection of the service accelerator 152, the selection engine 130 can identify a candidate set of service providers 184 (e.g., utilizing a geo-fence centered on the user's 174 current location), and select an optimal service provider 189 to service the ride. Thereafter, the selection engine 130 can generate and transmit a service invitation 132 to the optimal service provider 189 via the service provider app 185 executing on the service provider device 180. In response to an acceptance 181 of the service invitation 132, the selection engine 130 can transmit a confirmation 134 to the requesting user 174 indicating that a service provider 189 is en route to the service location.

In variations, different input types on a service accelerator 152 can cause different responses. For example, in executing the service application 175 the requester device 170 can detect swipe gestures, tap and hold gestures (long press), and/or single tap gestures being performed by the user 174 on a service accelerator 152. In some aspects, a tap and hold gesture can cause a service request 171 to be sent automatically to the network computer system 100. In such aspects, while the service request 171 is being processed by the selection engine 130, the service application 175 can display a processing screen (e.g., including a cancelation feature) indicating that a service provider is being matched before displaying an en route screen. Additionally or alternatively, a normal tap gesture (short press) on a service accelerator 152 can cause the service application 175 to display a confirmation screen with the information corresponding to the service accelerator 152 (e.g., the service location and service type) prepopulated.

Figure 2:
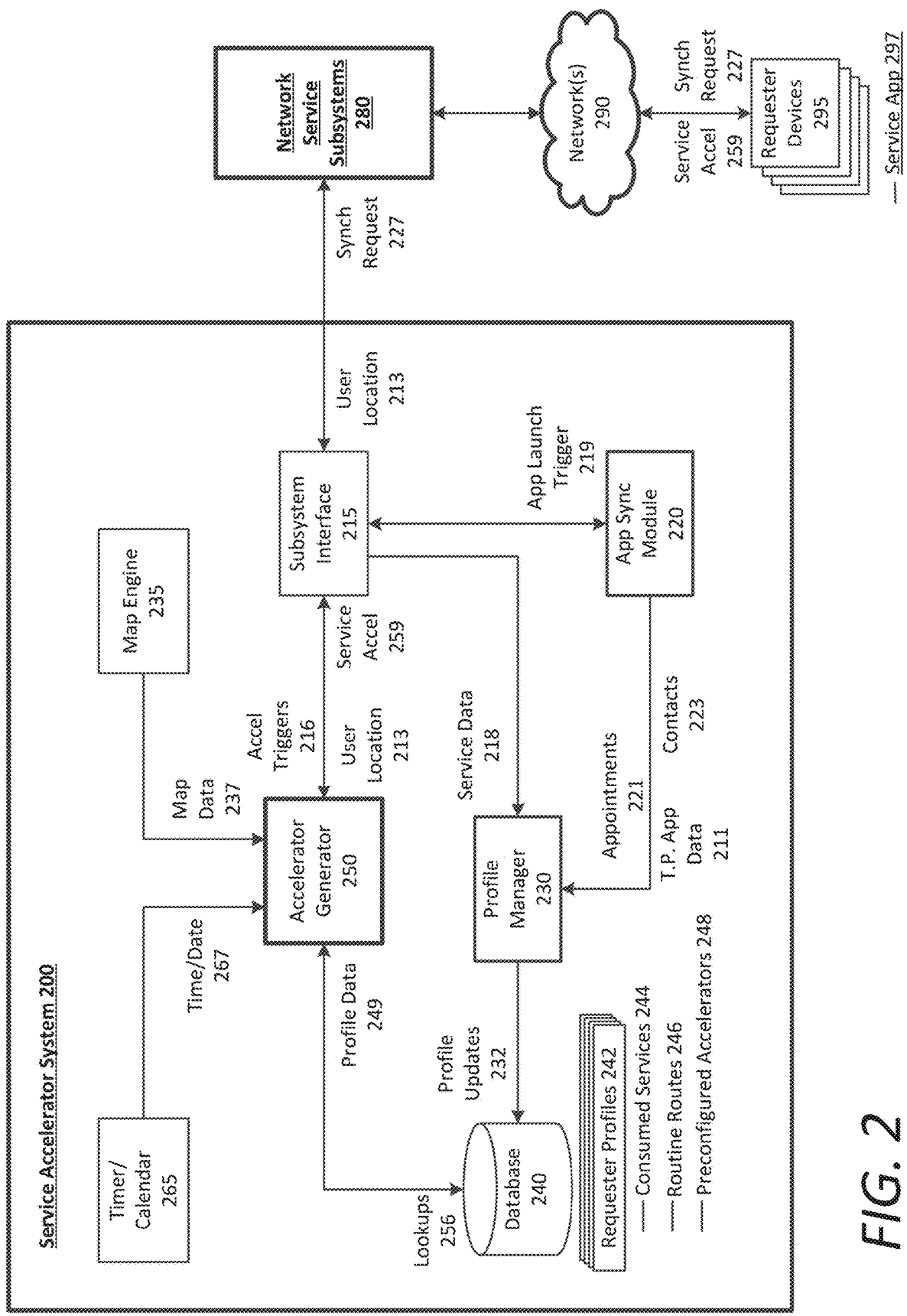
FIG. 2 is a block diagram illustrating an example destination accelerator system utilized in connection with a network computer system, according to examples described herein.

FIG. 2 is a block diagram illustrating an example service accelerator system utilized in connection with a network computer system, according to examples described herein. The service accelerator system 200 shown and described with respect to FIG. 2 can comprise one or more logical blocks or components as shown and described with respect to FIG. 1. For example, the service accelerator system 200 can be connected to network-based service subsystems 280, which can comprise certain components of FIG. 1, such as the application interface 125, selection engine 130, and content engine 120 of the network computer system 100. Referring to FIG. 2, the service accelerator system 200 can include a database 240 that stores requester profiles 242 of users of the on-demand network-based service in a given region. In various examples, the requester profiles 242 can include all or the most recent services 244 consumed by the user (e.g., rides consumed through an on-demand transport service), routine routes 246 for the user, and/or preconfigured service accelerators 248 for certain on-demand service types (e.g., default destination accelerators for the user, such as for home and/or work).

The service accelerator system 200 can include a profile manager 230 that can receive service data 218 for each user, and utilize the service data 218 to generate profile updates 232 for a given user's profile 242. The service data 218 can include data indicating each service consumed by a given user, and details of the service, such as a service location, a transportation destination, any stops made, a time of day for the service, a day of the week (e.g., weekday versus weekend), weather information, traffic data, and the like. Accordingly, the profile manager 232 can update the consumed services 244 in the user's profile 242 based on the service data 218 received from the network-based service subsystems 280.

In some examples, the service accelerator system 200 can further include an application synchronization module 220 that can identify when a particular requester device 295 launches the service application 297. This detection can occur via an application launch trigger 219 from the service application 297 on the requester device 295. The application launch trigger 219 can cause the application synchronization module 220 to generate a synchronization request 227 to access third party data and other user data on the requester device 295. In one example, the synchronization request 227 can enable the user to accept or decline the service accelerator system 200 in its request to accept the user data. If the user accepts, then the application synchronization module 220 can parse through various data sources, such as a contacts list, appointment calendar, travel plans, social media information, and the like. The application synchronization module 220 can pull the user's contacts 223, any upcoming appointments 221, and other third party application data 211 from the requester device 295 to enable the profile manager 230 to update the user's requester profile 242 in the database 240.

In certain examples, data items including destination, time, and date information (e.g., appointments 221 or a travel itinerary) can cause the profile manager 230 to generate a preconfigured accelerator 248 in the requester profile 242. The preconfigured accelerator 248 can include preset accelerator triggers 216 that can cause an accelerator generator 250 to generate a service accelerator 259 for display on the requester device 295. Other information, such as the third party application data 211 and the contacts 223 can aid in enabling the accelerator generator 250 to determine the manner in which new service accelerators 259 may be generated.

The service accelerator system 200 can include a timer/calendar 265 that provides time and date information 267 to the accelerator generator 250, and a map engine 235 that can provide map data 237 to the accelerator generator 250.

According to examples described herein, the accelerator generator 250 can receive user location data 213 from a respective requester device 295 when the service application 297 is executing thereon. In some aspects, the user location 213 can act as an accelerator trigger 216 when the user enters a certain geo-fenced area associated with a service accelerator 259, or leaves a location associated with a service accelerator 259 (e.g., the user's home). Furthermore, the accelerator generator 250 can be programmed to or otherwise execute logic that causes the accelerator generator 250 to create a service accelerator 259 by imparting a set of criteria based on information specific to the user, or even information not specific to the user (e.g., general popular destinations, scheduled events, etc.). When satisfied by observed accelerator triggers 216, these criteria can cause the accelerator generator 250 to cause the service accelerator 259 to be displayed on the requester device 295. In certain implementations, the accelerator generator 250 can perform lookups 256 in the requester profiles 242 or otherwise receive profile data 249 from the requester profiles 242 in order to configure the set of criteria for a service accelerator 259.

The accelerator generator 267 can monitor the time and date information 267, the user locations 213 in the map data 237, and other accelerator triggers 216. Once the set of criteria for a particular service accelerator 259 are triggered by the observed accelerator triggers 216, the accelerator generator 250 can generate the service accelerator 259 for display on the requester device 295 (e.g., a home screen on the service application 297). As provided herein, the user can select the service accelerator 259 to request an on-demand service automatically. In one aspect, the single input selection of the service accelerator 259 causes the network-based service subsystems 280 to automatically request a specified ride service type for the user, and a service location based on the current user location data 213 from the requester device 295. Thus, the user's service type preferences can also be indicated in the user's profile 242. As described herein, for on-demand transport, the ride service type can comprise any of a ride-pooling service, a basic ride share service, a luxury vehicle service, a van or large vehicle service, a professional driver service (e.g., where the service provider is certified), a self-driving vehicle transport service, and the like.

Furthermore, the service type preference of the user can be context specific (e.g., time and/or date specific, or location specific). For example, the service data 218 may indicate that the user prefers the basic ride-share service during the day and a luxury transport service at night. Accordingly, the default selection of a ride service type (e.g., by the selection engine 130 of FIG. 1) may be based on the current context of the user's state. Alternatively, the user may be requested to confirm information such as an estimated or upfront price for the service and/or the selected service type.

In various aspects, the accelerator generator 250 can continue to monitor accelerator triggers 216 to determine when to remove the service accelerator 259 from being displayed. As a basic example, if the user drives or walks home, the accelerator generator 250 can cause the home destination accelerator 259 to be removed from the home screen of the service application 297. In more multifaceted examples, a service accelerator 259 having multiple requirements may be removed when one of the requirements ceases to apply. This requirement can be a time expiration, a location expiration, situational change triggers (e.g., weather, traffic, event schedules, etc.), and any combination of the foregoing.

Methodology

Figure 3A:
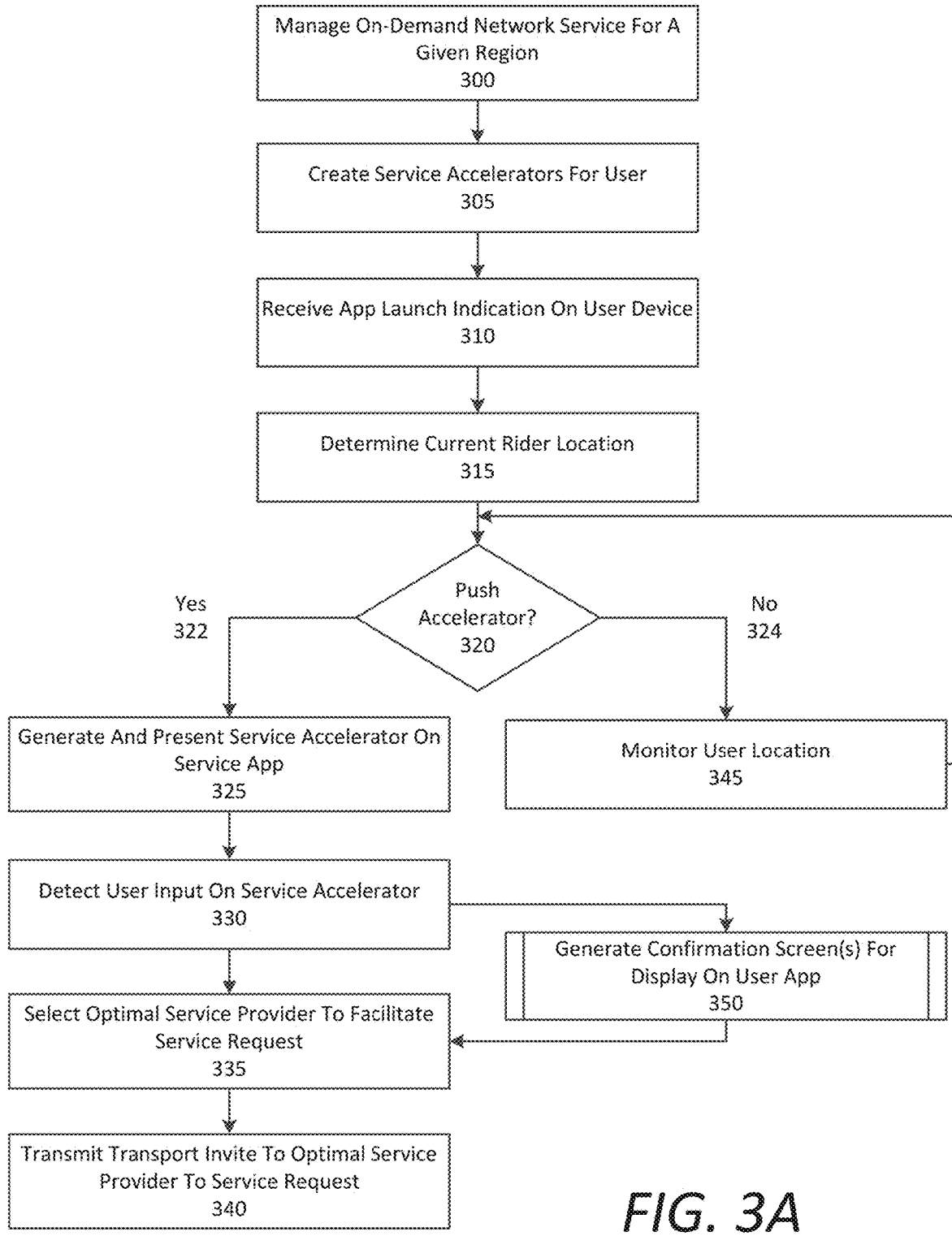
FIG. 3A is a flow chart describing an example method of generating a service accelerator, according to examples described herein.

FIG. 3A is a flow chart describing an example method of generating a service accelerator, according to examples described herein. In the below discussion of the FIG. 3A, reference may be made to reference characters representing like features as shown and described with respect to FIGS. 1 and 2. Furthermore, the processes described with respect to FIG. 3A may be performed by an example network computer system 100 implementing a service accelerator system 200 as shown and described with respect to FIGS. 1 and 2. Referring to FIG. 3A, the network computer system 100 can manage an on-demand network-based service for a given region (300). For each user of the one-demand network-based service, the network computer system 100 can create a number of service accelerators 152 (305). As described herein, the service accelerator 152 can be displayed on the requester device 170 of the user (e.g., on a home screen of an executing service application 175), and can be selectable to cause the network computer system 100 to automatically request a service for the user. Furthermore, the service accelerators 152 may be specific to the user, and can be attributed to a specified on-demand network-based service, such as a bill payment service, a repair service, delivery service, or transportation service. For on demand transportation services, the service accelerator 152 can further include common locations of the user, such as a work location, a home location, a gym location, a store location, and the like.

In some examples, the network computer system 100 can receive an app launch indication from a requester device 170, indicating that the user 174 has launched the service application 175 (310). Based on the app launch indication, the network computer system 100 can determine the current location 173 of the user 174 (315). Based on the current location 173 of the user 174, the network computer system 100 can determine whether to push one or more service accelerators 152 to be displayed on the requester device 170 of the user (320). For example, if the user is located at home, the network computer system 100 will not cause a home destination accelerator 152 for a transportation service to be displayed. However, one or more other default accelerators 152 may be displayed, such as a "work" destination accelerator, or a "store" destination accelerator.

Accordingly, if the current location 173 of the user 174 corresponds to a trigger 177 to display one or more service accelerators 152 (322), the network computer system 100 can generate and present the service accelerator(s) 152 on a user interface of the service application 175. However, if the current location 173 of the user 174 does not correlate with a trigger 177 for any service accelerators 152 associated with the user 174 (324), then the network computer system 100 can continue to monitor the user's dynamic location (345).

For service accelerators 152 displayed on the user interface of the service application 175, the network computer system 100 can detect a user input 176 on a particular service accelerator 152 (330). In some examples, the user input 176 can trigger the network computer system 100 to generate one or more confirmation screen(s) to be displayed on the requester device 170 to confirm the default service type associated with the selected service accelerator 152, the estimated or actual price, and/or enable the user 174 to modify the service request 171 (350). Additionally or alternatively, the network computer system 100 can automatically identify a service location in proximity to or at the user's current location 173, and select an optimal service provider 189 to facilitate the service request 171 corresponding to the selected service accelerator 152 (335). Once the optimal service provider 189 is selected, the network computer system 100 can transmit a service invitation 132 to the computing device 180 of the optimal service provider 189 via an executing service provider application 185 to fulfill the service request 152 (340).

Figure 3B:
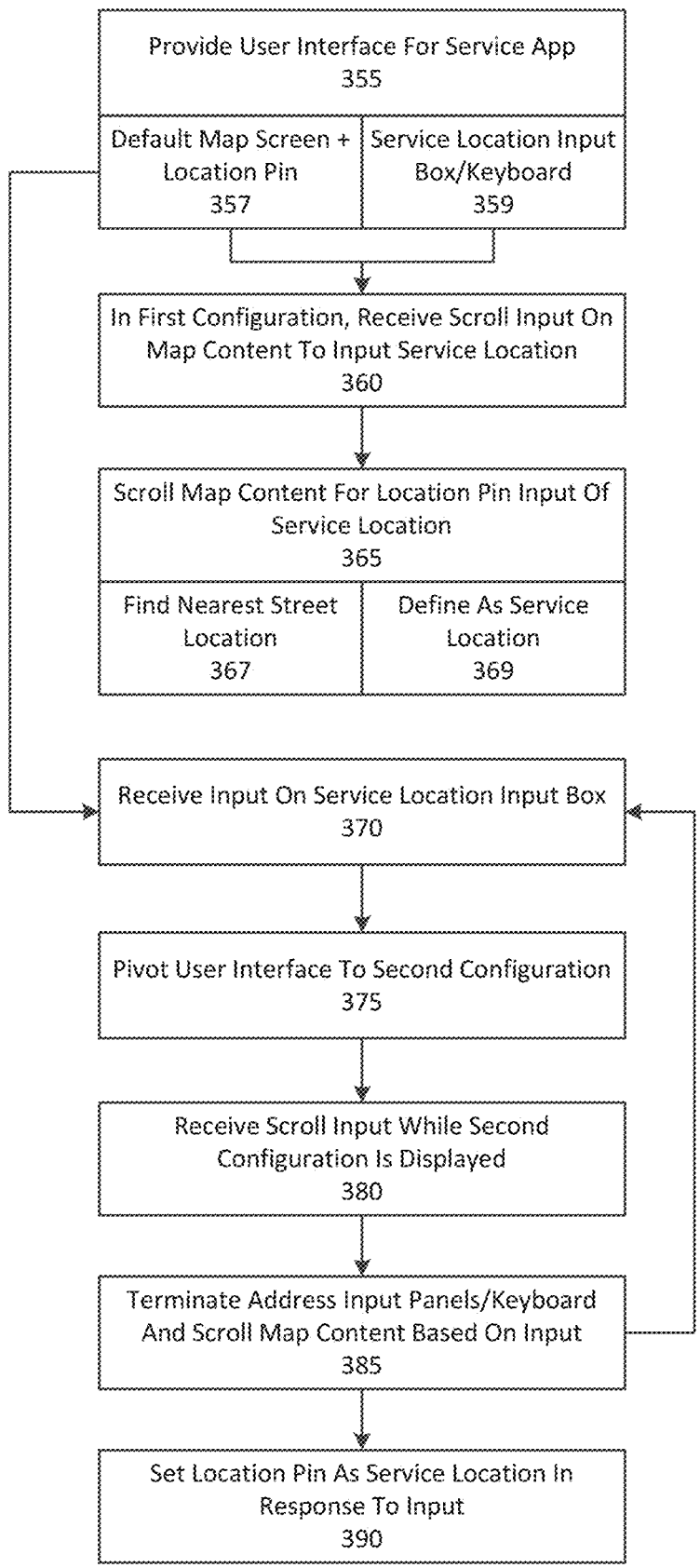
FIG. 3B is a flow chart describing an example method of pivoting a user interface to enable input of one or more service locations.

FIG. 3B is a flow chart describing an example method of pivoting a user interface to enable input of one or more service locations (e.g., a pick-up location and a destination location for an on-demand transportation service), according to examples described herein. The network computer system 100 can provide a user interface for a service application 175 to be displayed on a requester device 170 (355). For example, the user interface can include a screen to enable the user 174 to input a service location in order to submit a service request 171 for the on-demand network-based service. As provided herein, this user interface screen can dynamically pivot between two configurations, which can affect the manner in which the user 174 inputs a service location. Thus, a first pivot configuration can include a default map screen with a location pin in which the user can scroll the map content in order to set the location pin as the service location (357). A second pivot configuration may be displayed in response to a specified user input on the default map screen, such as a selection input on an address input box that is persistently displayed in the first pivot configuration. The second pivot configuration can enable the user to manually input an address for the service location, and can include a keyboard to enable the input (359).

In the first pivot configuration, the requester device 170 can receive a scroll input on the map content to input the service location (360). Based on the scroll input, the requester device 170 can cause the map content to scroll accordingly, enabling the user 174 to input the location pin at a certain desired location on the map (365). In some aspects, once the location pin is set, the requester device 170 can find a nearest street location (367), and define the location as the service location (369). Accordingly, the user 174 is enabled to set a service location by scrolling the map content displayed on the requester device 170.

In certain implementations, the first pivot configuration can also include a persistent input feature (e.g., an input box) that enables the user to manually input an address or location for the service location. At any given time when the user interface is in the first pivot configuration, the requester device 170 can receive a user input on the service location input box (370). In response to the input, the requester device 170 can dynamically pivot the first configuration to the second configuration to display at least a keyboard and the input box (375). In further examples, the pivot can also cause one or more "address" or "places" panels to be displayed in the second configuration in order to further aid the user 174 in inputting the service location. Furthermore, the user input on the input box can disable map scrolling functions while causing the additional panels (e.g., keyboard, a predictive address panel, a favorite locations panel, etc.) to overlay or replace the map content. As provided herein, the service location can comprise a location at which a selected service provider is to rendezvous with the requesting user, or where the service provider is to perform the requested service. In the context of on-demand transport services, the service location(s) can comprise a pick-up location, a destination location, or both.

This pivoting mechanism may be distinct from screen-loading, as the dynamic pivoting between the two configurations can occur on a single screen using cached or other stored or readily pulled content items to enable the pivoting configurations. Thus, while the user interface is in the second pivot configuration, the requester device 170 can receive a specified user gesture (e.g., a scroll input) (380), and in response to the gesture, pivot the user interface back to the first configuration by removing any additional panels and/or the keyboard from the user interface, and re-enabling map content scrolling (385). As discussed herein, when the user 174 inputs the location pin on a desired location, the requester device 170 can set the location pin on the scrollable map content as the service location or destination (390). However, at any given time prior to inputting the service location or destination, the requester device 170 can receive an input on the display input box to once again pivot the user interface to the second pivot configuration (370).

The sequencing of user interface screens can be provided in any number of suitable manners. In certain examples, once the user 174 enters the service location in either the first or the second pivot configuration, the service application 175 can enable the user to submit a service request 171. For transport services, a new pivoting interface like the one discussed above, may be displayed to enable the user 174 to enter a desired destination location. In certain examples, the pivoting interface can be displayed if the user opts not to utilize a service accelerator 152 on a home screen of the service application 175. In other examples, the pivoting interface can be displayed on the service application whenever the user wishes to input an address or location using the service application 175, whether inputting a service location, a rendezvous point, a destination, or a place of interest. Further description of the pivoting interface is provided below in connection with FIG. 6C.

Figure 4:
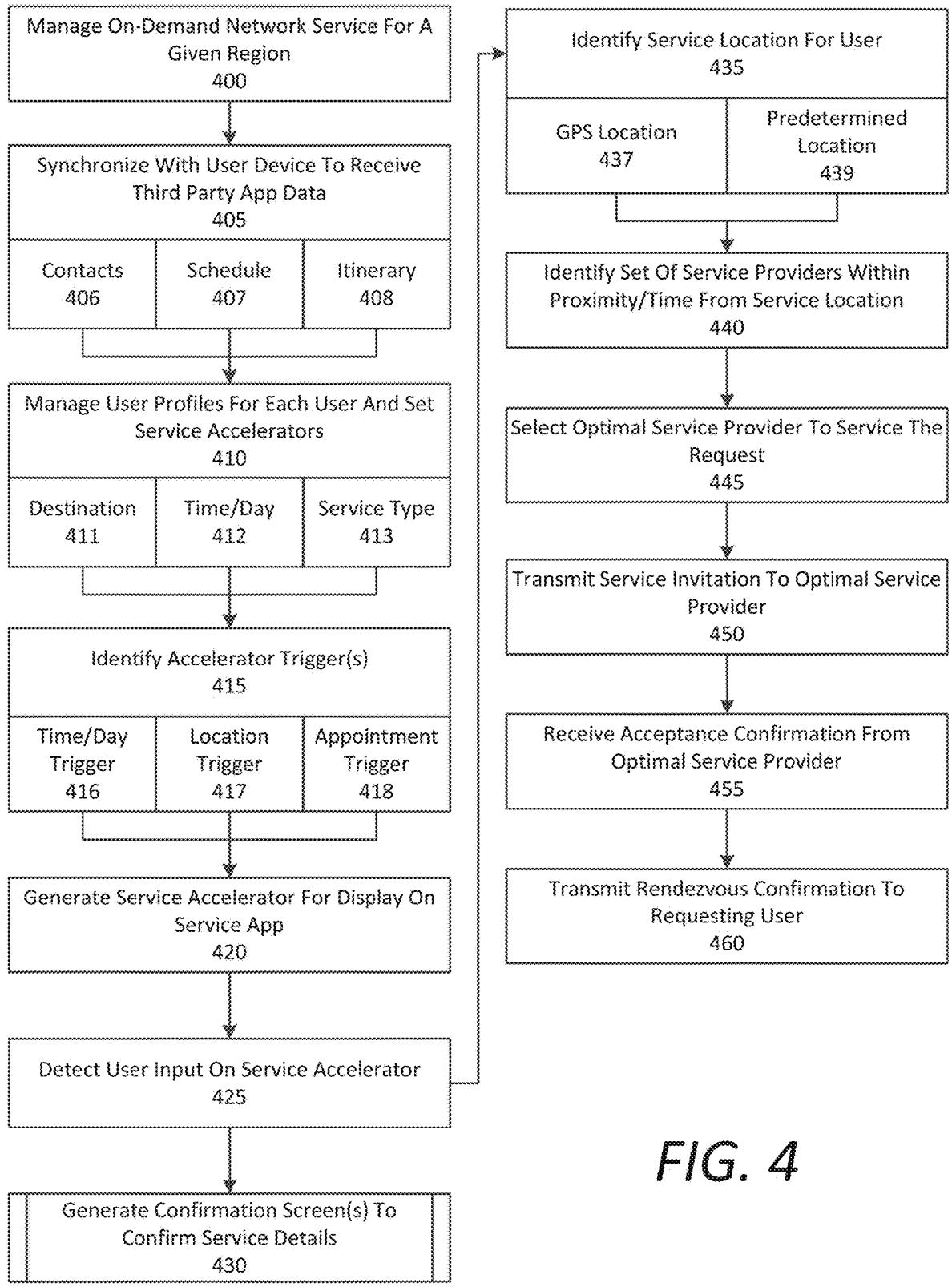
FIG. 4 is a flow chart describing an example method of configuring a service accelerator and facilitating on-demand services, according to examples described herein.

FIG. 4 is a flow chart describing an example method of configuring a service accelerator and facilitating on-demand services, according to examples described herein. As discussed above, the network computer system 100 can manage an on-demand transportation service for a given region (400). In certain examples, the network computer system 100 can synchronize with a requester device 170 to receive third party application data 162 specific to the user 174 (405). This third party application data 162 can include contacts from a contacts application (e.g., a phonebook or a social media application) (406), the user's schedule from a calendar application (407), a travel itinerary or schedule from a travel application (408), and the like.

In various aspects, the network computer system 100 can manage requester profiles 144 and can configure service accelerators 152 for each of the users 174 (410). The requester profiles 144 can indicate common destinations for the user 174—such as a home location, a work location, and other frequented locations by the user 174—which the network computer system 100 can utilize to set a number of default accelerators 152. Furthermore, the network computer system 100 can associate each service accelerator 152 with a set of requirements or criteria that, when satisfied, cause the network computer system to generate the service accelerator 152 on the requester device 170. Accordingly, each service accelerator 152 may be associated with a particular destination location (411), a time of day and/or day of the week (412), and/or an on-demand service type (413).

According to examples, the network computer system 100 can identify accelerator triggers 179 based on the current state of the user 174 (415). For example, the network computer system 100 can receive data corresponding to the current location 173 of the user 174 (e.g., from location-based resources on the requester device 170). The location 173 of the user 174 can enable the network computer system 100 to identify location triggers (417) that cause or contribute to causing a service accelerator 152 to be displayed on the requester device 170. Further, the network computer system 100 can further identify time of day and/or day of the week triggers (416). Still further, the network computer system 100 can identify appointment triggers (418), in which time and location are specified (e.g., a meeting, a conference, a travel plan, etc.). When the requirements for a particular service accelerator 152 are met, the network computer system 100 can generate a service accelerator 152 for display via the service application 175 executing on the user's device (420).

In certain aspects, the network computer system 100 can detect a user input 176 on the displayed service accelerator 152 (425). In one implementation, the user input 176 can cause the network computer system 100 to generate one or more confirmation screens to confirm service details, such as price and service type (430). Alternatively, the user input 176 can trigger the network computer system 100 to identify a service location for the user (435). The service location can be based on a current location 173 of the user 174 (e.g. via GPS resources of the requester device 170), or can be a predetermined location based on past utilization the on-demand network-based service (e.g., a convenient street corner as a pick-up location, or a location near the user's home) (439).

The network computer system 100 can then identify a set of service providers 184 within a location proximity or estimated time from the service location (440), and select an optimal service provider 189 to service the accelerator ride request (445). Thereafter, the network computer system 100 can transmit a service invitation 132 to the optimal service provider 189 to fulfill or otherwise complete the service request, which the service provider 189 can accept or decline (450). If the service provider 189 declines, then the network computer system 100 can identify another optimal service provider 189, either from the candidate set of service providers 184, or from a new set of service providers based on the service location. However, if the service provider accepts, then the network computer system 100 can receive an indication of the acceptance confirmation 181 from the optimal service provider 189 (455), and transmit a rendezvous confirmation to the requesting user 174 (460).

User Device

Figure 5:
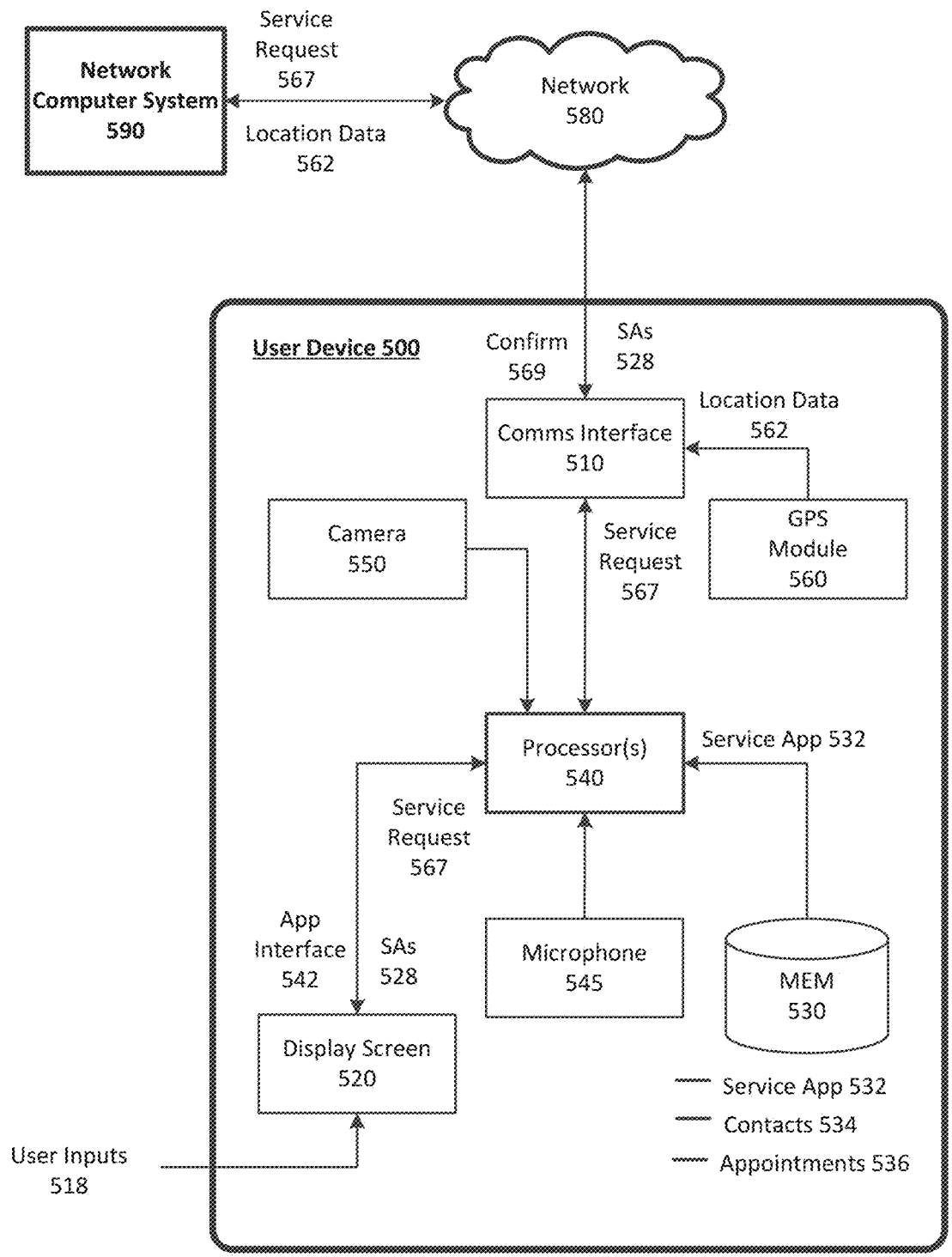
FIG. 5 is a block diagram illustrating an example user device executing a designated service application for an on-demand network-based service, as described herein.

FIG. 5 is a block diagram illustrating an example user device executing a designated service application for an on-demand network service, as described herein. In many implementations, the user device 500 can comprise a mobile computing device, such as a smartphone, tablet computer, laptop computer, VR or AR headset device, and the like. As such, the user device 500 can include typical telephony features such as a microphone 545, a camera 550, and a communication interface 510 to communicate with external entities using any number of wireless communication protocols. In certain aspects, the user device 500 can store a designated application (e.g., a service app 532) in a local memory 530. In many aspects, the user device 500 further store information corresponding to a contacts list 534, and calendar appointments 536 in the local memory 530. In variations, the memory 530 can store additional applications executable by one or more processors 540 of the user device 500, enabling access and interaction with one or more host servers over one or more networks 580.

In response to a user input 518, the service app 532 can be executed by a processor 540, which can cause an app interface 542 to be generated on a display screen 520 of the user device 500. The app interface 542 can enable the user to, for example, check current price levels and availability for the on-demand network-based service. In various implementations, for transport services, the app interface 542 can further enable the user to select from multiple service types, such as a carpooling service, a regular ride-sharing service, a professional ride service, a van or high-capacity vehicle transport service, a luxurious ride service, and the like.

The user can generate a service request 567 via user inputs 518 provided on the app interface 542. For example, the user can select a service location, view the various service types and estimated pricing, and select a particular service type (e.g., for transportation to an inputted destination). As provided herein, the service application 532 can further enable a communication link with a network computer system 590 over the network 580, such as the network computer system 100 as shown and described with respect to FIG. 1. Furthermore, as discussed herein, the service application 532 can enable the network computer system 590 to cause service accelerators 528 to be displayed on the application interface 542. The service accelerators 528 can be selected to automatically cause a service request to be generated and transmitted to the network computer system 590 (e.g., with preconfigured service locations and/or destinations).

The processor 540 can transmit the service requests 567 via a communications interface 510 to the backend network computer system 590 over a network 580. In response, the user device 500 can receive a confirmation 569 from the network computer system 590 indicating the selected service provider that will fulfill the service request 567 and rendezvous with the user at the service location. In various examples, the user device 500 can further include a GPS module 560, which can provide location data 562 indicating the current location of the requesting user to the network computer system 590 to, for example, establish the service location and/or select an optimal service provider to fulfill the service request 567.

User Interface Screenshots

Figures 6A, 6B:
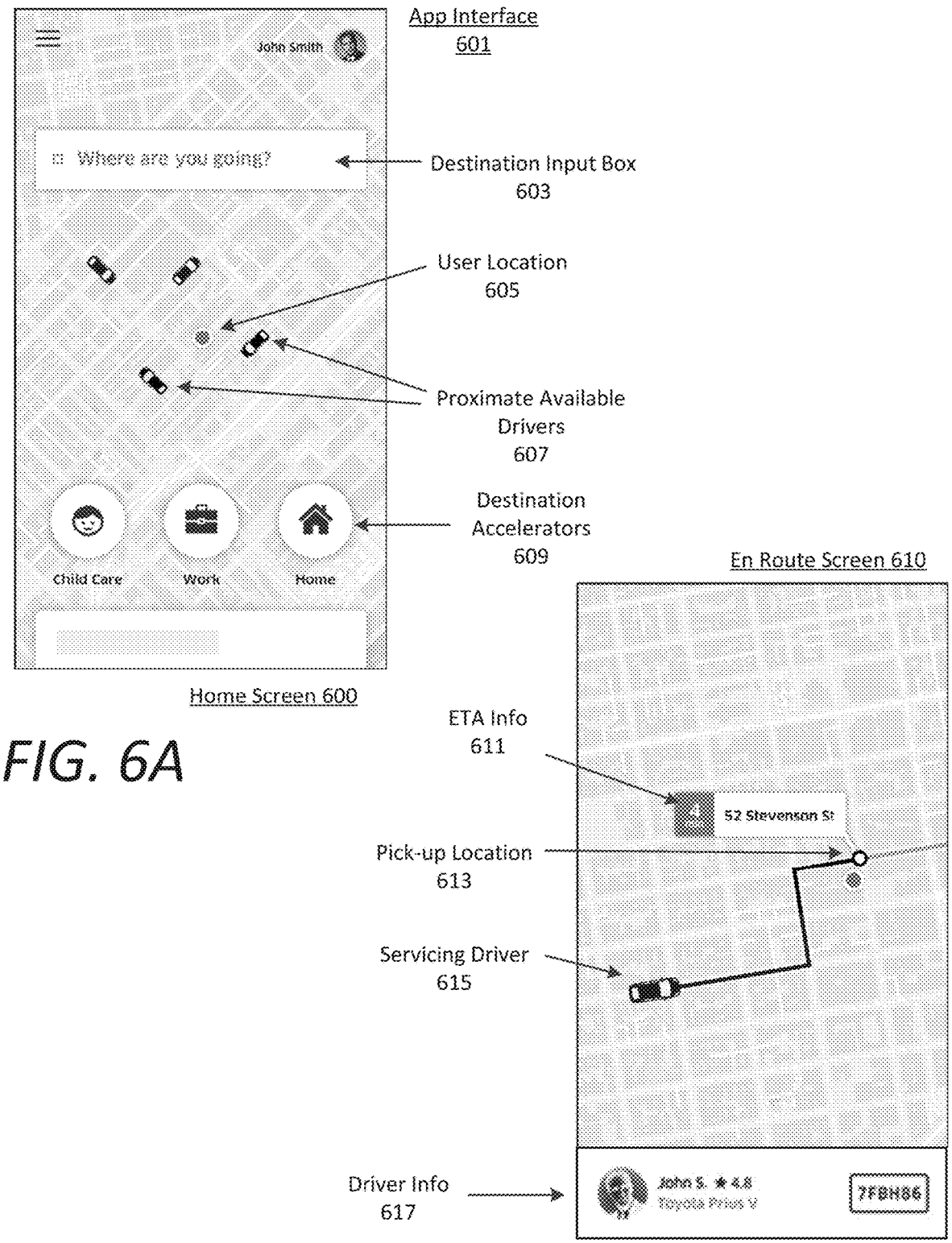
FIGS. 6A through 6C illustrate example screenshots of a user interface on a user device, according to examples described herein.
Figure 6C:
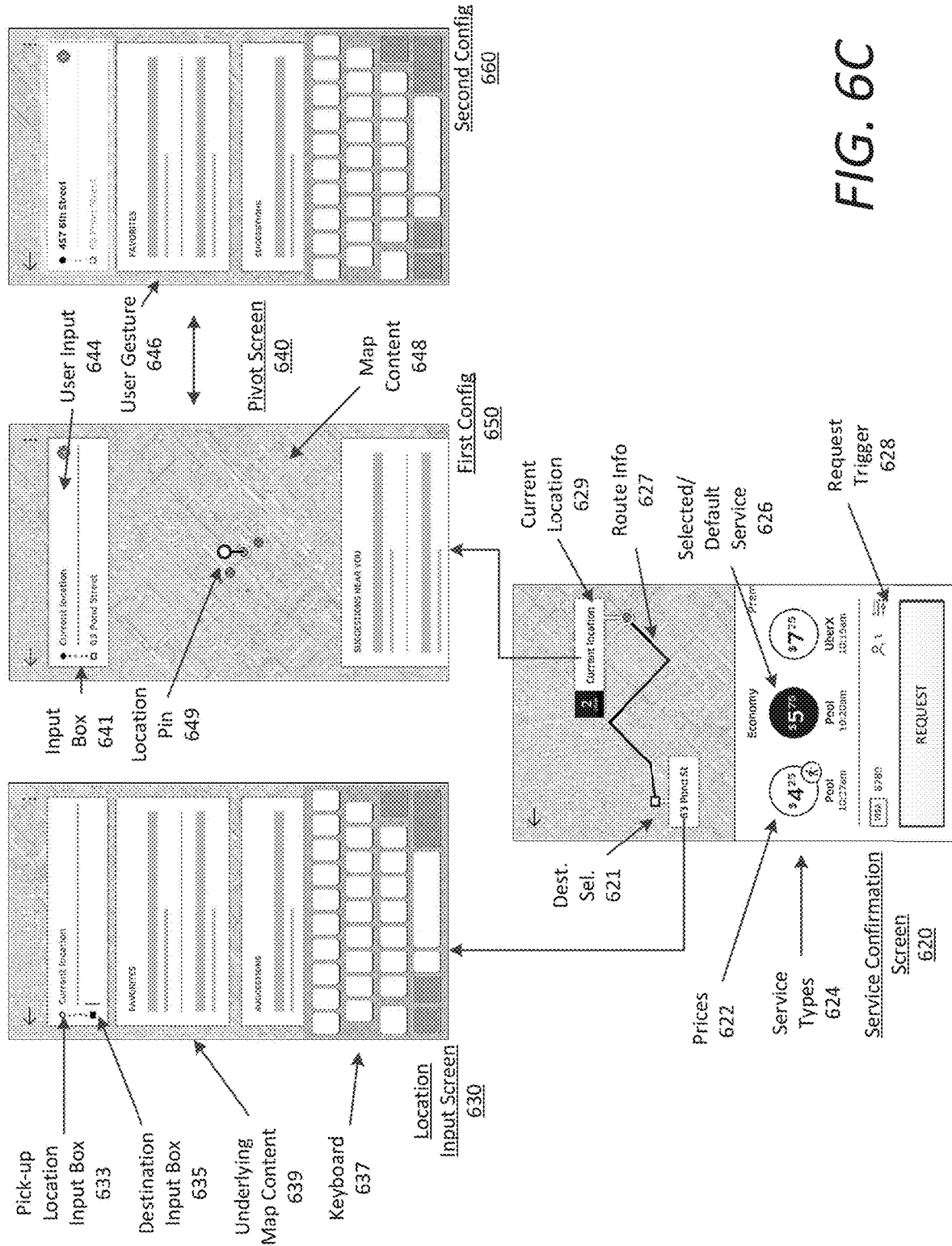

FIGS. 6A through 6C illustrate example screenshots of a user interface on a user device, according to examples described herein. In the below description of FIGS. 6A through 6C, reference may be made to reference characters representing like features as shown and described with respect to FIG. 5. Furthermore, in the context of FIGS. 6A through 6C, the on-demand network-based service can comprise an on-demand transportation service utilizing destination accelerators as the service accelerators. Thus, a service provider can comprise a driver, and service request can comprise a request for pick-up to cause the on-demand transportation service to select an optimal driver to rendezvous with the requesting user at a pick-up location, and transport the requesting user to an inputted destination. Referring to FIG. 6A, execution of the service application 532 on the user device 500 can cause an app interface 601 to be generated on the display screen 520. In some aspects, the app interface 601 can comprise an initial home screen 600, and can feature such elements as a destination input box 603, a location feature 605 indicating the user's current location, and virtual representations of proximate available drivers 607. According to examples provided, the home screen 600 can also include a number of destination accelerators 609 that are selectable to automatically submit a pick-up request without additional input or manual intervention by the user, or with minimal additional input (e.g., a confirmation selection on a subsequent screen).

FIG. 6B illustrates an "en route" screen 610 generated once a pick-up request has been submitted and a servicing driver 615 has been selected. In certain aspects, the en route screen 610 can be generated as a subsequent screen in response to a user selection of a service accelerator in the form of a destination accelerator 609 on the home screen. Thus, a single input on the destination accelerator 609 can cause the screen shown in FIG. 6B to be generated. The en route screen 610 can include a pick-up location 613 as well as the user's current location, and estimated time of arrival information 611 for the servicing driver 615. In many aspects, the en route screen 610 can further include driver information 617 such as the servicing driver's 615 name, vehicle type, and license plate number.

FIG. 6C shows a screen sequence chain indicating a service confirmation screen 620, a location input screen 630, and a pivot screen 640 having a first pivot configuration 650 and a second pivot configuration 660. In some examples, the service configuration screen 620 can be presented as a confirmation screen in response to a user selection of a destination accelerator 609, as shown in FIG. 6A. In other examples, the service configuration screen 620 can be presented in response to a user setting a pick-up location pin 649, and submitting a pick-up request. In such examples, the user may then configure the destination manually by inputting a destination selection 621, which can cause the location input screen 630 or the pivot screen 640 to be displayed. As provided herein, selection of a destination accelerator 609 (shown in FIG. 6A) can bypass a number of these additional steps.

The service confirmation screen 620 can display a plurality of service types 624 and price information 622 corresponding to each service type. As shown on the service screen 620, the service types 624 include a combination of walking and ride-pooling services, a ride-pooling service, and a standard ride-sharing service. As described herein, it is contemplated that destination accelerators displayed on the home screen 600, and associated with a particular ride service type, can include the price information 622 shown in FIG. 6C—which can comprise an estimated price or an upfront, guaranteed price for a requested ride. For destination accelerator implementations, a default service 626 may be highlighted and the user can confirm the ride request by selecting a request trigger 628, thereby triggering the en route screen 610 of FIG. 6B. The price information 624 can comprise an estimated cost of the trip or an upfront price that may be guaranteed for the trip. In addition, the service confirmation screen 620 can enable the user to view proposed route information 627 between a current location 625 and the inputted or preconfigured destination. Furthermore, in some examples, the service confirmation screen can provide estimated time of arrival information 629 for the resultant ride, which can be based on current traffic conditions.

In certain implementations, the user can modify the pick-up location and/or destination location by selecting either the current location feature 625 or the destination selection feature 621. In either case, one of the location input screen 630 or the pivot screen 640 may be displayed. In one example, the pivot screen 640 is displayed only for pick-up location configuration in response to a user selection of the current location feature 625. Additionally or alternatively, the pivot screen 640 is displayed upon a user selection of the destination selection feature 621 to enable the user to configure the destination location. In variations, the location input screen 630 is displayed to enable the user to manually input—using a displayed keyboard 637—the pick-up location via a pick-up location input box 633, and/or the destination location via a destination input box 635. In such variations, the interface panels and be generated to overlay underlying map content 639.

For pivot screen 640 examples, selection of the current location feature 625 or the destination selection feature 621 can cause a first pivot configuration 650 to be generated. The first pivot configuration 650 can comprise scrollable map content 648 and a location pin 649 to enable the user to set a location—whether a destination or a pick-up location. In the example shown, the first configuration 650 can also include an input box 641 that enables the user to provide a user input 644 on either the pick-up location box or the destination box. Throughout the description of FIGS. 6A through 6C, "input boxes" are shown as selectable to enable manual input. However, it is contemplated that any selectable feature, such as an icon or map indicator, can be selected to enable manual input (e.g., of a location), or may be inputted via voice command. As provided herein, the user input 644 on the input box 641 can trigger the second pivot configuration 660 to be generated on the pivot screen 640, and can cause the scrollable nature of the map content 648 to be disabled.

Thus, the pivot screen 640 can comprise a single screen having pre-cached or otherwise pre-configured content, or readily accessed content without requiring significant content loading, that can be dynamically generated in response to the user input 644 on the input box 641. In this example, the pre-configured content can comprise a number of panels and a keyboard that can assist the user in inputting a location (e.g., the pick-up location). In one example, the assistive panels can include a "favorites" panel indicating common locations for the user. Additionally or alternatively, the assistive panels can include a "suggestions" panel that can comprise locations relating to predictive text in the input box 641, popular locations within proximity to the user, or locations predictive of the user's personal interests. At any given time while the second pivot configuration 660 is displayed, the user can provide a predetermined input 646 to cause the pivot screen 640 to return to the first pivot configuration 650. In one example, the predetermined input 646 can comprise a swipe or scroll input anywhere on the display. Processing resources, via execution of the rider application on the rider device, can translate the swipe or scroll input—while the user interface displays the pivot screen 640 in the second pivot configuration 660—into a command to dismiss the assistive panels and keyboard, re-enable the scrollable nature of the map content 648, and generate the pivot screen 640 in the first pivot configuration 650.

Upon input of the destination and/or pick-up location, the rider application can return to the service confirmation screen 620 to enable the user to submit the ride request. Furthermore, once the pick-up location, destination, and ride service type are configured, the user may select the request trigger 628. In response to the request trigger 628, the backend transport facilitation system 100 (shown and described with respect to FIG. 1), can select a driver to service the request, and cause the en route screen 610 (of FIG. 6B) to be presented on the display of the rider device.

The above description of the screen sequence chain of FIG. 6C is illustrative of various example implementations of user interactions on the app interface 601 in order to make a ride request. However, as described herein, the use of preconfigured destination accelerators 609 can bypass a number of steps, such as the steps of inputting the destination, inputting the pick-up location, inputting the ride service type, and even inputting the ride request on the request trigger 628. Thus, it is contemplated that one or more of the foregoing steps may be circumvented through user selection of a destination accelerator 609. Consequently, it is also contemplated that all such input steps may be circumvented through user selection of a destination accelerator 609—in which the app interface 601 transitions directly from the home screen 600 of FIG. 6A, to the en route screen 610 of FIG. 6B.

Service Provider Device

Figure 7:
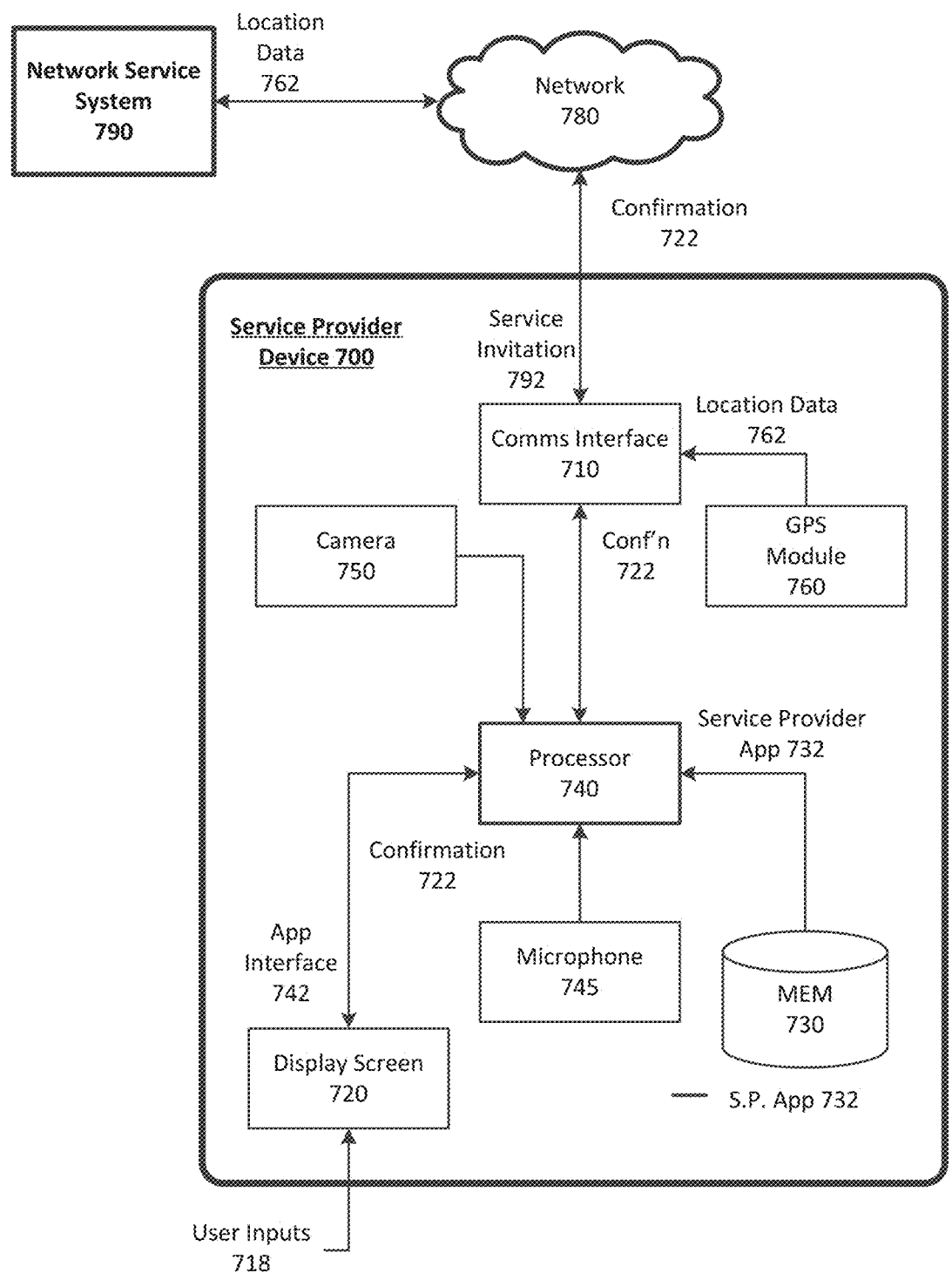
FIG. 7 is a block diagram illustrating an example service provider device executing a designated service provider application to facilitate an on-demand network-based service, as described herein.

FIG. 7 is a block diagram illustrating an example service provider device executing a designated service provider application for an on-demand network service, as described herein. In many implementations, the service provider device 700 can comprise a mobile computing device, such as a smartphone, tablet computer, laptop computer, VR or AR headset device, and the like. As such, the service provider device 700 can include typical telephony features such as a microphone 745, a camera 750, and a communication interface 710 to communicate with external entities using any number of wireless communication protocols. The service provider device 700 can store a designated application (e.g., a service provider app 732) in a local memory 730. In response to a user input 718, the service provider app 732 can be executed by a processor 740, which can cause an app interface 742 to be generated on a display screen 720 of the service provider device 700. The app interface 742 can enable the service provider to, for example, accept or reject service invitations 792 in order to fulfill service requests throughout a given region.

In various examples, the service provider device 700 can include a GPS module 760, which can provide location data 762 indicating the current location of the service provider to the network computer system 790 over a network 780. Thus, the network computer system 790 can utilize the current location 762 of the service provider to determine whether the service provider is optimally located to fulfill a particular service request. If the service provider is optimal to fulfill the service request, the network computer system 790 can transmit a service invitation 792 to the service provider device 700 over the network 780. The service invitation 792 can be displayed on the app interface 742, and can be accepted or declined by the service provider. If the service provider accepts the invitation 792, then the service provider can provide a user input 718 on the displayed app interface 742 to provide a confirmation 722 to the network computer system 790 indicating that the service provider will rendezvous with the requesting user at the service location to fulfill the service request.

Hardware Diagram

Figure 8:
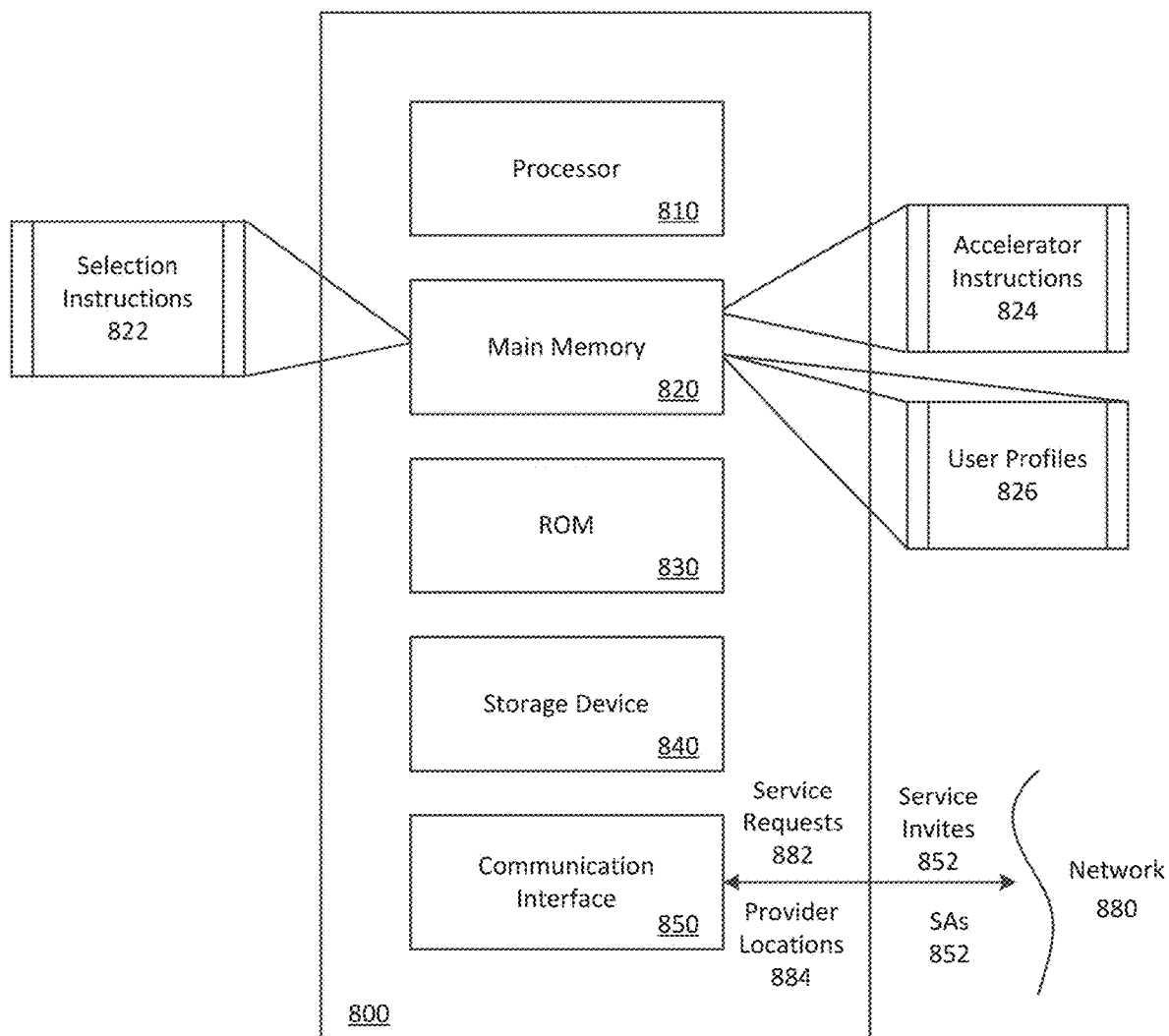
FIG. 8 is a block diagram illustrating a computer system upon which examples described herein may be implemented.

FIG. 8 is a block diagram that illustrates a computer system upon which examples described herein may be implemented. A computer system 800 can be implemented on, for example, a server or combination of servers. For example, the computer system 800 may be implemented as part of a network-based service for providing transportation services. In the context of FIG. 1, the network computer system 800 may be implemented using a computer system 800 such as described by FIG. 8. The network computer system 100 may also be implemented using a combination of multiple computer systems as described in connection with FIG. 8.

In one implementation, the computer system 800 includes processing resources 810, a main memory 820, a read-only memory (ROM) 830, a storage device 840, and a communication interface 850. The computer system 800 includes at least one processor 810 for processing information stored in the main memory 820, such as provided by a random access memory (RAM) or other dynamic storage device, for storing information and instructions which are executable by the processor 810. The main memory 820 also may be used for storing temporary variables or other intermediate information during execution of instructions to be executed by the processor 810. The computer system 800 may also include the ROM 830 or other static storage device for storing static information and instructions for the processor 810. A storage device 840, such as a magnetic disk or optical disk, is provided for storing information and instructions.

The communication interface 850 enables the computer system 800 to communicate with one or more networks 880 (e.g., cellular network) through use of the network link (wireless or wired). Using the network link, the computer system 800 can communicate with one or more computing devices, one or more servers, and/or one or more self-driving vehicles. In accordance with examples, the computer system 800 receives service requests 882 from mobile computing devices of individual users. The executable instructions stored in the memory 830 can include selection instructions 822, which the processor 810 executes to select an optimal service provider to fulfill or complete the service request 882. In doing so, the computer system can receive service provider locations 884 of service providers operating throughout the given region, and the processor can execute the selection instructions 822 to select an optimal service provider from a set of available service providers, and transmit a service invitation 852 to enable the service provider to accept or decline the requested service.

The executable instructions stored in the memory 820 can also include accelerator instructions 824, which enable the computer system 800 to access user profiles 826 and other user information in order to generate service accelerators 854 for display on the user devices. As described extensively throughout, these service accelerators 854 can be selectable to automatically generate service requests 882, bypassing a number of superfluous steps when such accelerators 854 are utilized.

By way of example, the instructions and data stored in the memory 820 can be executed by the processor 810 to implement an example network computer system 100 of FIG. 1. In performing the operations, the processor 810 can receive service requests 882 (e.g., via manual input or service accelerators 854) and service provider locations 884, and submit service invitations 852 to facilitate the servicing of the requests 882.

The processor 810 is configured with software and/or other logic to perform one or more processes, steps and other functions described with implementations, such as described by FIGS. 1-7, and elsewhere in the present application.

Examples described herein are related to the use of the computer system 800 for implementing the techniques described herein. According to one example, those techniques are performed by the computer system 800 in response to the processor 810 executing one or more sequences of one or more instructions contained in the main memory 820. Such instructions may be read into the main memory 820 from another machine-readable medium, such as the storage device 840. Execution of the sequences of instructions contained in the main memory 820 causes the processor 810 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computing system comprising:
   a network communication interface communicating, over one or more networks, with computing devices of users of a network service;
   one or more processors; and
   a memory storing instructions that, when executed by the one or more processors, cause the computing system to:
   detect, over the one or more networks, a launch of a rider application on a computing device of a user of the network service;
   based on the launch of the rider application, receive, over the one or more networks and via a GPS resource of the computing device, a current location of the user;
   generate contextual information that includes the current location of the user, a current time, and a day of the week;
   determine a usage pattern for the user based on historical data corresponding to historical utilization of the network service by the user;
   based at least in part on a determination that a confidence associated with a correlation between the contextual information and the usage pattern exceeds a threshold, determine one or more suggested destination locations for the user;
   transmit, over the one or more networks, display data to the computing device of the user, the display data causing the rider application to display a destination accelerator feature for each of the one or more suggested destination locations, wherein the rider application displays the destination accelerator feature for each of the one or more suggested destination locations without receiving manual user input after being launched by the user;
   based, at least in part, on a user selection of the destination accelerator feature for a destination location of the one or more suggested destination locations, receive, over the one or more networks from the computing device of the user, a service request for transporting the user to the destination location without the user manually inputting other information to identify the destination location;
   receive, over the one or more networks and via GPS resources of a plurality of service provider devices, a plurality of current locations of a plurality of candidate service providers;
   process the service request by selecting, from the plurality of candidate service providers, a service provider to fulfill the service request based, at least in part, on the plurality of current locations of the plurality of candidate service providers; and
   transmit, to the computing device of the user over the one or more networks, information about a transport service for transporting the user to the destination location, wherein the transmitted information includes a service time associated with the selected service provider.

2. The computing system of claim 1, wherein the usage pattern indicates historical correlations associated with one or more pick-up locations of the user, one or more corresponding destination locations of the user, one or more times of day for requesting the network service by the user, and one or more days of the week for requesting the network service by the user.

3. The computing system of claim 2, wherein the executed instructions further cause the computing system to determine the usage pattern for the user by determining, from the historical data, one or more routine service locations inputted by the user in connection with the network service, and wherein the one or more suggested destination locations correspond to the one or more routine service locations inputted by the user.

4. The computing system of claim 1, wherein the destination accelerator feature for each of the one or more suggested destination locations is associated with one of a plurality of transport service types provided by the transport service.

5. The computing system of claim 4, wherein the plurality of transport service types includes a carpool service and a default ride-sharing service.

6. The computing system of claim 5, wherein the plurality of transport service types further includes at least one of a luxury vehicle service, a high capacity vehicle service, a professional driver service, or a self-driving vehicle service.

7. The computing system of claim 1, wherein the one or more suggested destination locations comprise at least one of a home location or a work location of the user.

8. The computing system of claim 1, wherein the display data further comprises a start time that, when triggered, causes the destination accelerator feature for a corresponding suggested destination location to be automatically displayed within the rider application on the computing device of the user.

9. The computing system of claim 8, wherein the executed instructions cause the computing system to further associate the destination accelerator feature for each of the one or more suggested destination locations with one or more days of the week in which the destination accelerator feature is to be displayed on the computing device of the user.

10. The computing system of claim 1, wherein the display data causes the rider application to generate the destination accelerator feature for each of the one or more suggested destination locations to be displayed on a home screen of a user interface of the rider application.

11. The computing system of claim 1, wherein the executed instructions further cause the computing system to:
   synchronize with a calendar application on the computing device of the user, the calendar application indicating an appointment for the user at an appointment location; and
   generate and transmit the display data to cause the rider application to display a specified destination accelerator feature on the computing device of the user, the specified destination accelerator feature comprising the appointment location as a suggested destination location of the user.

12. The computing system of claim 11, wherein the calendar application comprises a travel application, and wherein the appointment comprises a departing trip time of a scheduled trip for the user.

13. A non-transitory computer readable medium storing instructions that, when executed by one or more processors of a computing system, cause the computing system to:
   detect, over one or more networks, a launch of a rider application on a computing device of a user of a network service;
   based on the launch of the rider application, receive, over the one or more networks and via a GPS resource of the computing device, a current location of the user;
   generate contextual information that includes the current location of the user, a current time, and a day of the week;
   determine a usage pattern for the user based on historical data corresponding to historical utilization of the network service by the user;
   based at least in part on a determination that a confidence associated with a correlation between the contextual information and the usage pattern exceeds a threshold, determine one or more suggested destination locations for the user;
   transmit, over the one or more networks, display data to the computing device of the user, the display data causing the rider application to display a destination accelerator feature for each of the one or more suggested destination locations, wherein the rider application displays the destination accelerator feature for each of the one or more suggested destination locations without receiving manual user input after being launched by the user;
   based, at least in part, on a user selection of the destination accelerator feature for a destination location of the one or more suggested destination locations, receive, over the one or more networks from the computing device of the user, a service request for transporting the user to the destination location without the user manually inputting other information to identify the destination location;
   receive, over the one or more networks and via GPS resources of a plurality of service provider devices, a plurality of current locations of a plurality of candidate service providers;
   process the service request by selecting, from the plurality of candidate service providers, a service provider to fulfill the service request based, at least in part, on the plurality of current locations of the plurality of candidate service providers; and
   transmit, to the computing device of the user over the one or more networks, information about a transport service for transporting the user to the destination location, wherein the transmitted information includes a service time associated with the selected service provider.

14. The non-transitory computer readable medium of claim 13, wherein the usage pattern indicates historical correlations associated with one or more pick-up locations of the user, one or more corresponding destination locations of the user, one or more times of day for requesting the network service by the user, and one or more days of the week for requesting the network service by the user.

15. The non-transitory computer readable medium of claim 14, wherein the executed instructions further cause the computing system to determine the usage pattern for the user by determining, from the historical data, one or more routine service locations inputted by the user in connection with the network service, and wherein the one or more suggested destination locations correspond to the one or more routine service locations inputted by the user.

16. The non-transitory computer readable medium of claim 13, wherein the destination accelerator feature for each of the one or more suggested destination locations is associated with one of a plurality of transport service types provided by the transport service.

17. The non-transitory computer readable medium of claim 16, wherein the plurality of transport service types includes a carpool service and a default ride-sharing service.

18. The non-transitory computer readable medium of claim 17, wherein the plurality of transport service types further includes at least one of a luxury vehicle service, a high capacity vehicle service, a professional driver service, or a self-driving vehicle service.

19. The non-transitory computer readable medium of claim 13, wherein the one or more suggested destination locations comprise at least one of a home location or a work location of the user.

20. A computer-implemented method of servicing ride requests, the method being performed by one or more processors and comprising:
   detecting, over one or more networks, a launch of a rider application on a computing device of a user of a network service;
   based on the launch of the rider application, receiving, over the one or more networks and via a GPS resource of the computing device, a current location of the user;
   generating contextual information that includes the current location of the user, a current time, and a day of the week;
   determining a usage pattern for the user based on historical data corresponding to historical utilization of the network service by the user;
   based at least in part on a determination that a confidence associated with a correlation between the contextual information and the usage pattern exceeds a threshold, determining one or more suggested destination locations for the user;
   transmitting, over the one or more networks, display data to the computing device of the user, the display data causing the rider application to display a destination accelerator feature for each of the one or more suggested destination locations, wherein the rider application displays the destination accelerator feature for each of the one or more suggested destination locations without receiving manual user input after being launched by the user;
   based, at least in part, on a user selection of the destination accelerator feature for a destination location of the one or more suggested destination locations, receiving, over the one or more networks from the computing device of the user, a service request for transporting the user to the destination location without the user manually inputting other information to identify the destination location;
   receiving, over the one or more networks and via GPS resources of a plurality of service provider devices, a plurality of current locations of a plurality of candidate service providers;
   processing the service request by selecting, from the plurality of candidate service providers, a service provider to fulfill the service request based, at least in part, on the plurality of current locations of the plurality of candidate service providers; and transmitting, to the computing device of the user over the one or more networks, information about a transport service for transporting the user to the destination location, wherein the transmitted information includes a service time associated with the selected service provider.

\* \* \* \* \*